(12) United States Patent
Schlanger

(10) Patent No.: US 9,290,043 B2
(45) Date of Patent: Mar. 22, 2016

(54) VEHICLE WHEEL SPOKE CONNECTION

(76) Inventor: Raphael Schlanger, Wilton, CT (US)

(*) Notice: Subject to any disclaimer, the term of this patent is extended or adjusted under 35 U.S.C. 154(b) by 471 days.

(21) Appl. No.: 13/573,080

(22) Filed: Aug. 20, 2012

(65) Prior Publication Data

US 2013/0043712 A1    Feb. 21, 2013

Related U.S. Application Data

(60) Provisional application No. 61/575,380, filed on Aug. 19, 2011, provisional application No. 61/575,381, filed on Aug. 19, 2011, provisional application No. 61/575,374, filed on Aug. 19, 2011.

(51) Int. Cl.
*B60B 1/04* (2006.01)
*B60B 21/06* (2006.01)

(52) U.S. Cl.
CPC ............ *B60B 1/045* (2013.01); *B60B 1/041* (2013.01); *B60B 21/062* (2013.01); *B60B 2900/113* (2013.01); *B60B 2900/311* (2013.01)

(58) Field of Classification Search
CPC ........ B60B 1/041; B60B 1/043; B60B 1/044; B60B 1/045; B60B 21/025; B60B 21/062; F16B 37/0807; F16B 37/0821; F16B 37/0828; F16B 37/0871; F16B 37/0892
USPC ............. 301/55, 58, 61, 104; 411/433, 437
See application file for complete search history.

(56) References Cited

U.S. PATENT DOCUMENTS

| | | | | |
|---|---|---|---|---|
| 574,139 | A * | 12/1896 | Curry | 301/56 |
| 1,280,646 | A * | 10/1918 | Billhartz | 301/58 |
| 1,920,141 | A * | 7/1933 | Fischer | 411/432 |
| 3,224,796 | A * | 12/1965 | Burkitt | 285/149.1 |
| 4,895,471 | A * | 1/1990 | Geltz et al. | 403/104 |
| 6,484,752 | B1 * | 11/2002 | Ebinger et al. | 137/615 |
| 6,938,962 | B1 * | 9/2005 | Schlanger | 301/58 |
| 8,801,108 | B2 * | 8/2014 | Tho | 301/58 |
| 2004/0124694 | A1 * | 7/2004 | Tien | 301/58 |
| 2010/0264722 | A1 * | 10/2010 | Teixeira, IV | 301/58 |
| 2012/0235464 | A1 * | 9/2012 | Tho | 301/58 |

FOREIGN PATENT DOCUMENTS

| | | | |
|---|---|---|---|
| DE | 324303 | C * | 8/1920 |
| GB | 2479870 | | 2/2011 |

* cited by examiner

*Primary Examiner* — Kip T Kotter

(57) ABSTRACT

A vehicle wheel, comprising a rim, a hub, a plurality of spokes extending between the rim and hub, a bracing element including a hole with a central axis, a sidewall, a longitudinally inward entrance, and at least one of an engagement surface and an engagement edge outward of the entrance, a connecting element comprising a multiplicity of discreet segments. The bracing element comprises at least a portion of one of the rim and hub. At least one segment includes a laterally projecting overhanging surface. The first segment is positioned within the hole, with the overhang surface overlying one of the engagement surface and engagement edge in an overlie engagement. The second segment is positioned within the hole to include an opening between the first and second segments. The spoke is positioned within the opening and is connected to the connecting element with the overlie engagement to support spoke tensile load.

53 Claims, 18 Drawing Sheets

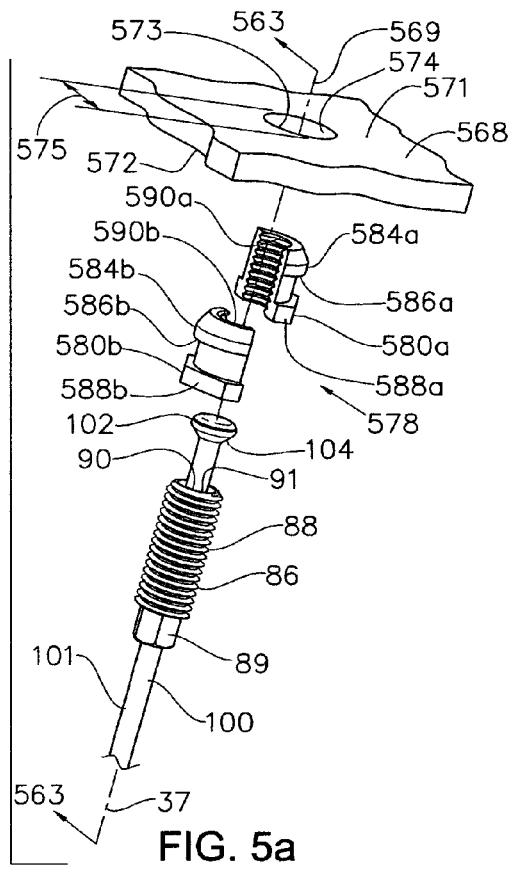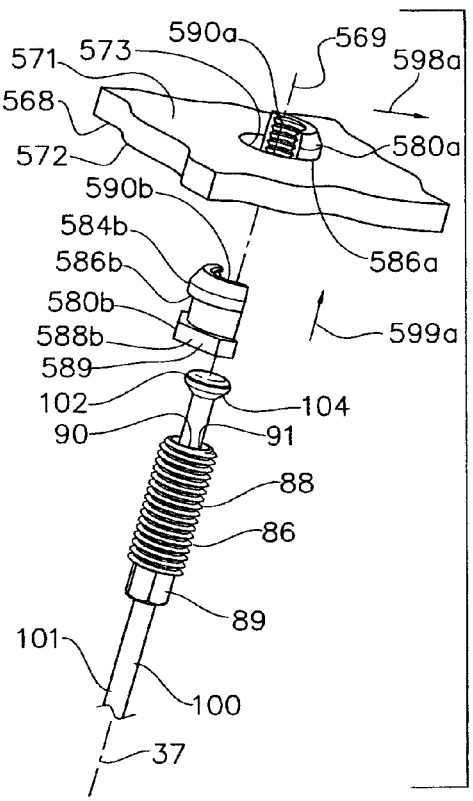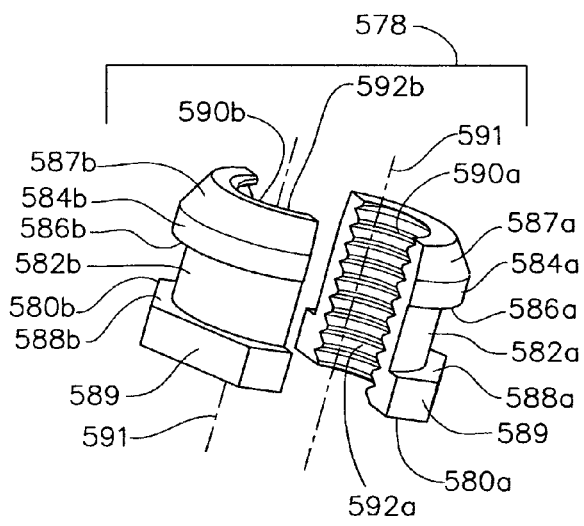
FIG. 5a
FIG. 5c
FIG. 5b

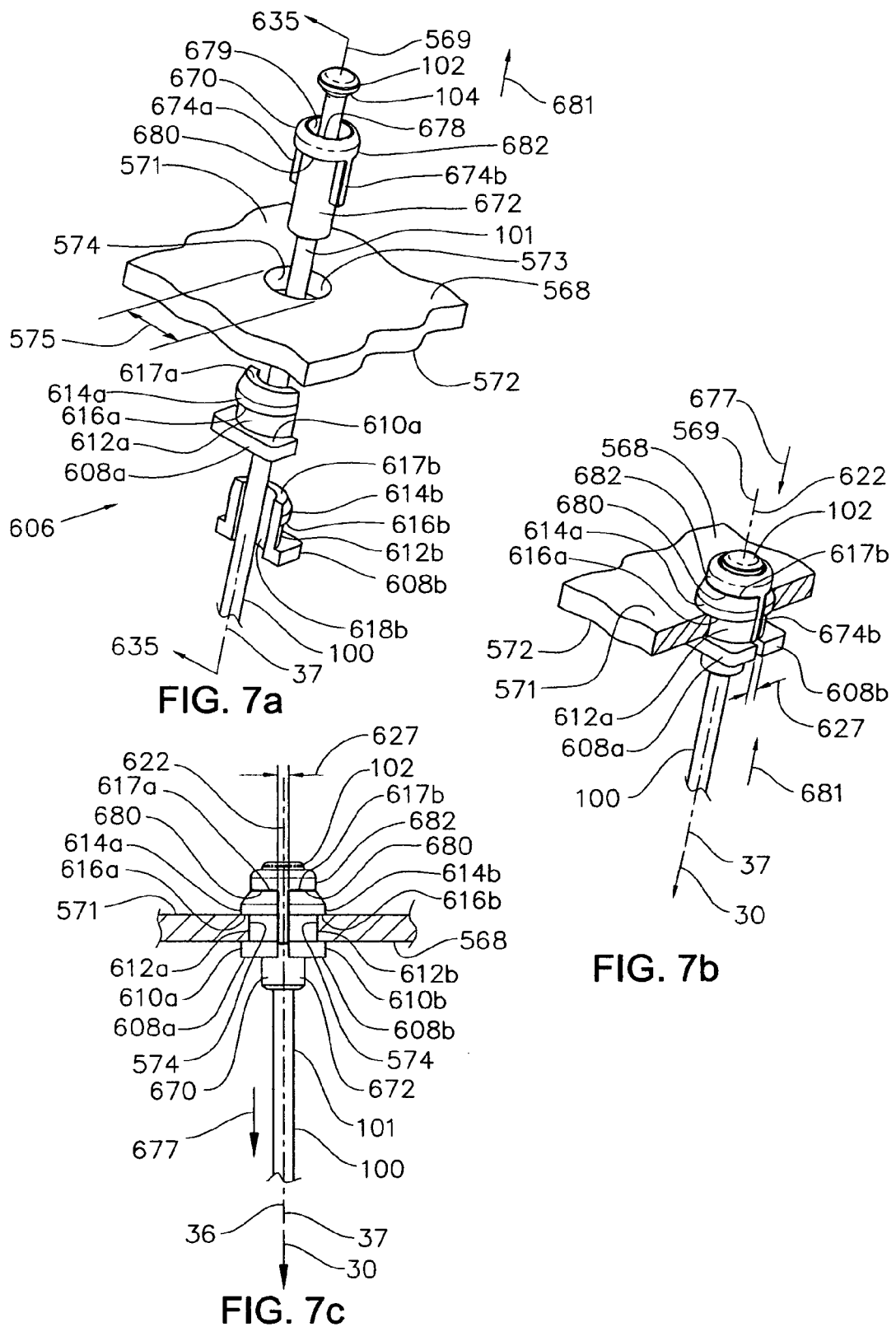

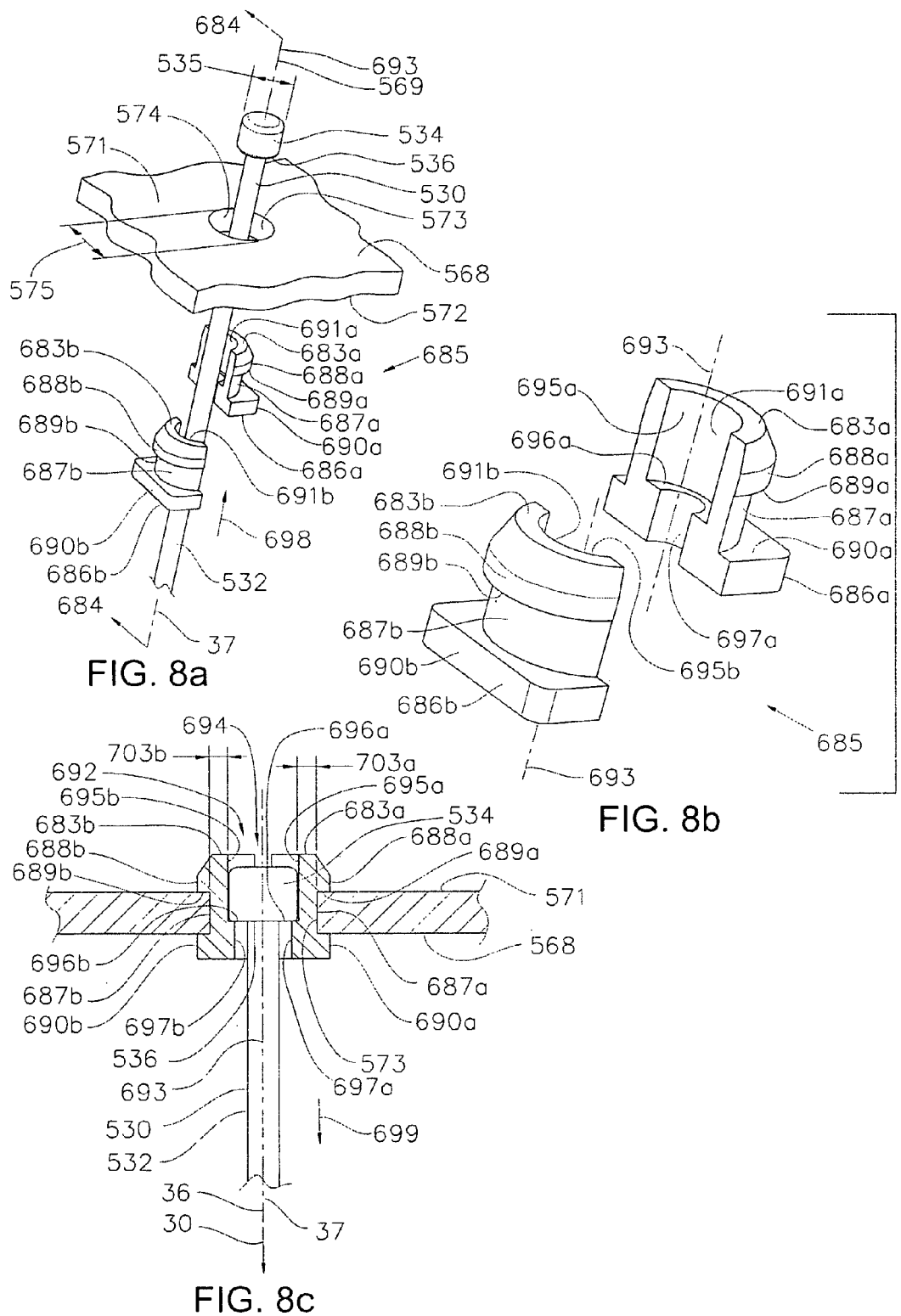

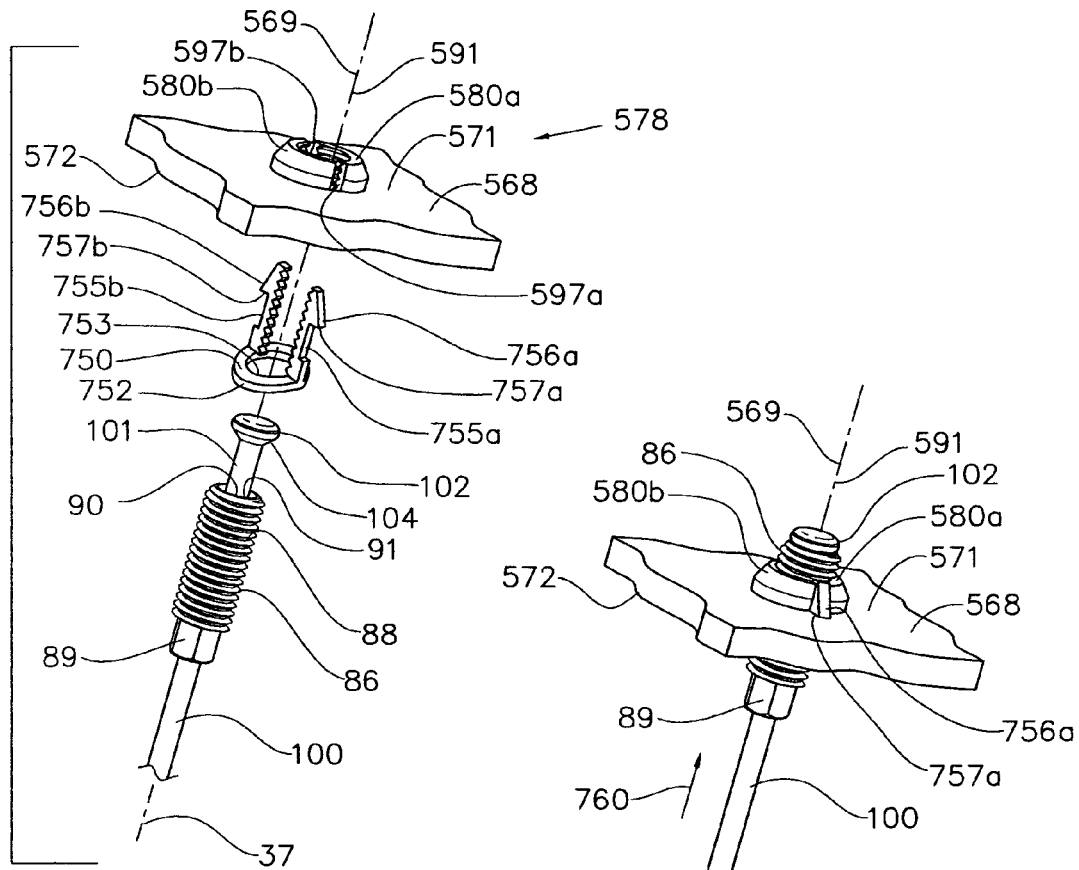
FIG. 12a
FIG. 12c
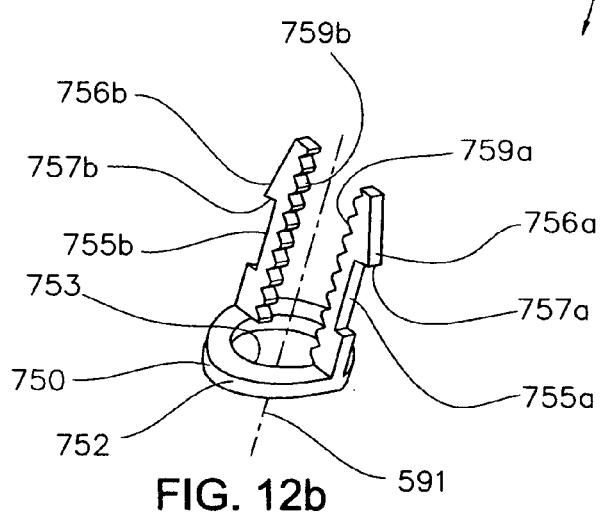
FIG. 12b

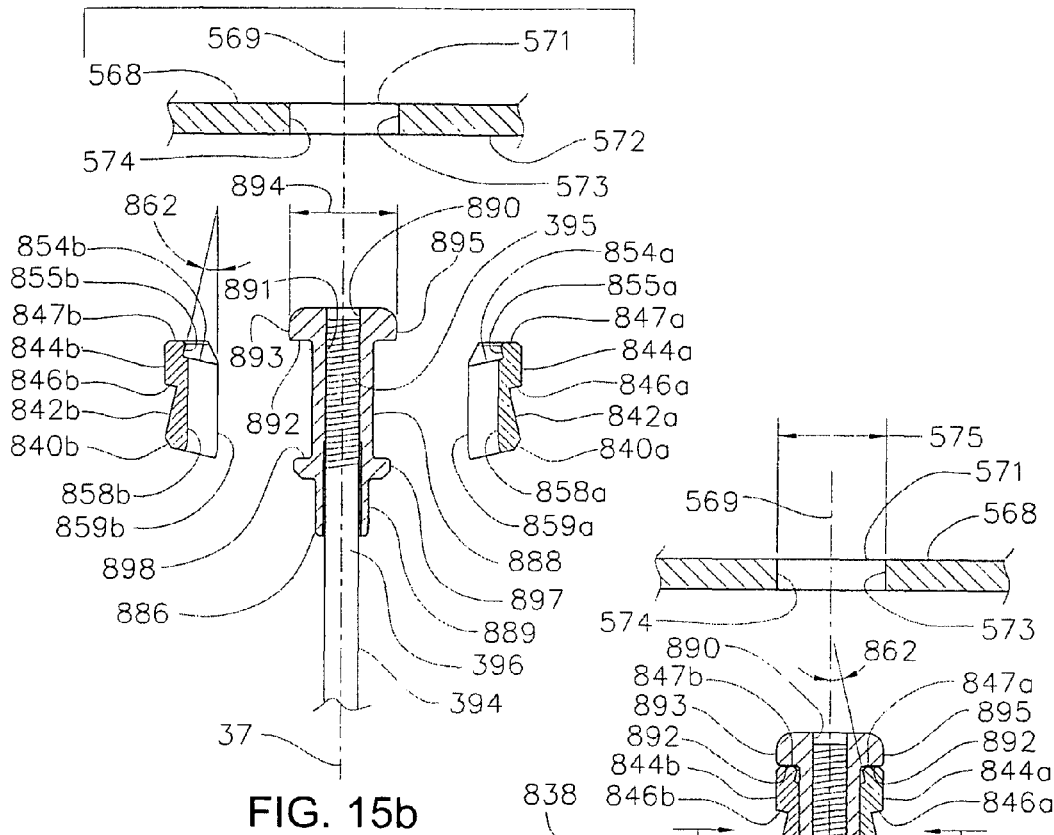
FIG. 15b
FIG. 15c
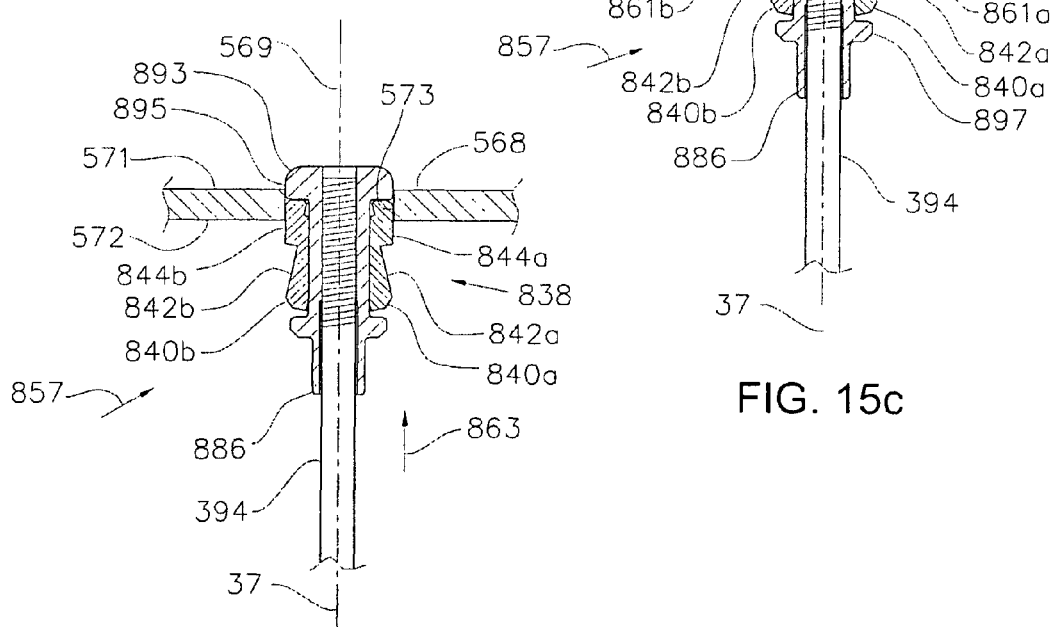
FIG. 15d

VEHICLE WHEEL SPOKE CONNECTION

CROSS-REFERENCE TO RELATED APPLICATION

This application claims priority of the following U.S. provisional patent applications:

61/575,380, filed Aug. 19, 2011, and entitled "VEHICLE WHEEL SPOKE CONNECTION";

61/575,381, filed Aug. 19, 2011, and entitled "VEHICLE WHEEL SPOKE CONNECTION"; and 61/575,374, filed Aug. 19, 2011, and entitled "VEHICLE WHEEL SPOKE CONNECTION".

BACKGROUND OF THE INVENTION (1) Field of the Invention

This invention is related to the means of attachment between the spoke and the rim of a vehicle wheel and between the spoke and the hub of a vehicle wheel. This invention is particularly related to the connection of a spoke with a rim structure having a "double-wall" construction with an unpierced tire bed wall for tubeless tire applications.

(2) Description of the Related Art

Bicycle wheel rims have historically been constructed to accept pneumatic tires that are designed to work in conjunction with an inner tube. This is the standard of the industry and is the arrangement that we are all familiar with. In such a prior art configuration, the rim's tire bed includes a through-hole that is drilled through for passage of the spoke nipple. In a rim of "single-wall" construction, the tire bed and the spoke bed are shared such that the spoke nipple bears directly against the rim's tire bed. In a rim of "double-wall" construction, the rim has two lateral walls, a tire bed wall and a spoke bed wall, usually with a radial gap or cavity therebetween. The rim is drilled through both walls, piercing both the tire bed and the spoke bed walls, with the spoke bed recessed below the tire bed to accept the spoke nipples. Generally, the spoke is presented through the spoke bed from the inside diameter of the rim and the spoke nipple is presented for attachment to the spoke through the tire bed and from the outside diameter of the rim. With single-wall or double-wall rim constructions, a rim strip is utilized to protect the inner tube from the sharp edges associated with the holes in the tire bed wall and/or with the spoke nipples. With rims of double-wall construction, the rim strip also serves to prevent the inner tube from extruding through the drilled access openings in the tire bed.

With the recent advent of tubeless tire technology, where the conventional inner tube is eliminated and the tire's beads are sealed directly against the rim, it is desirable that the tire bed wall be sealed and airtight to prevent air leakage from the tire cavity. This typically involves a rim of double-wall construction where the tire bed is sealed while the spoke bed is then adapted to accept the spokes. One preferable method for sealing the tire bed is to eliminate the aforementioned spoke access holes in the tire bed. If the tire bed is not pierced for the spokes, then the only hole through the tire bed will be for the tire inflation valve, which may be constructed of rubber and is relatively easy to seal against the tire bed. An example of such a tubeless arrangement is outlined by Lacombe et al. in U.S. Pat. No. 6,443,533, where the tire bed remains unpierced and the spoke bed includes extruded spoke holes that are directly threaded with internal threads to accept special externally threaded spoke nipples.

Reference is also made to prior art UK Patent Application GB2479870A by Jonathan Thulbon. Thulbon shows his spoke (3) connected to his rim (4) by eyelets (7). This eyelet is a one-piece element with slots (74) to provide flexure for installation with his rim. Thulbon's arrangement has several shortcomings: Firstly, the fact that his single-piece eyelet must flex for installation requires that the material of his eyelet be of relatively flexible and ductile material, such as unreinforced plastic. However, such material generally has low strength in comparison to stronger materials that are more rigid and less ductile, such as metals or fiber-reinforced plastics that would not be able to flex as Thurbon requires. Since spoke tension forces exert a very high stress at its connection to the rim, the weaker material of the Thulbon eyelet results in a relatively weak spoke connection that may also be more prone to flex and creep. Second, since Thulbon's eyelet is of one-piece design, the entire eyelet must be inserted at one time. This simultaneous installation, as well as accommodation for his flexure, places severe geometry restriction on his eyelet. As such, Thulbon's design is limited to a relatively shallow depth of lateral overlap and engagement between his eyelet and his rim, thus increasing stresses at this interface and further weakening his spoke connection. Thirdly, the overlie engagement between Thulbon's spoke nipple and eyelet is located inwardly from the outboard surface of his spoke bed, which requires that his eyelet include longitudinally outward extension portions that surround the head of his nipple to engage his rim. These extension portions require that the corresponding hole in his rim be significantly larger than the head of his spoke nipple. This oversized hole serves to further weaken his rim in this highly-loaded area. Fourthly, these extension portions also serve to laterally offset the overlie engagement between his rim and eyelet from the overlie engagement between his eyelet and nipple. This offset places additional tensile and bending stress on the eyelet due to spoke tension forces, further weakening his spoke connection. Fifthly, Thulbon does not contemplate a longitudinal engagement between his spoke and eyelet and instead utilizes only a single overlie engagement at a single longitudinal location. Such a single overlie engagement requires a very large laterally projected area of overlie to resist spoke tension loads, which results in a larger eyelet and a correspondingly larger hole in his rim.

SUMMARY OF THE INVENTION

The present invention utilizes an expandable connecting element or ferrule that may be blindly installed through a hole in the spoke bed. The connecting element is expanded to engage the edge and/or adjacent surface at the distal end of the hole. The spoke, or an intermediate element connected to the spoke, is engaged to the connecting element to create a firm connection between the spoke and the spoke bed. It is noted that the spoke bed constitutes a portion of the rim or hub flange to which the connecting element is attached. The novelty of such a blind connection of the spoke is particularly advantageous in conjunction with rims associated with tubeless tires.

It is an object of the present invention to create a spoke connection: that may be blindly installed with the spoke bed of the rim and/or hub: that may leave the tire bed of the rim to remain unpierced; that may eliminate the necessity of a rim strip; that may permit a spoke connection that may otherwise be geometrically impossible by conventional means; and that may result in a robust connection capable of resisting spoke tension loads.

One aspect of the invention involves a method for assembling a wheel. For each of a number of spoke holes in the wheel rim, a multi-piece connecting element associated with a given spoke is inserted radially outward through the spoke hole in the spoke bed of the rim (or radially inwardly for a spoke bed associated with a hub). The multiple discreet pieces (i.e. segments) of the connecting element may spread relative to each other or otherwise laterally shifted to effectively expand and engage the edge or surface adjacent the distal end of the hole. A spoke is then connected to the connecting element, either directly or by means of an intermediate connecting element. This connection between spoke and connecting element preferably includes an overlie engagement and/or a longitudinal engagement and/or an integral joinder.

In various implementations, the connecting element may or may not include a flange, the connecting element may be keyed to the hole, the connecting element may be keyed to the spoke bed surface, the connecting element's opening axis may be parallel to the hole's axis or the opening's axis may be at an angle to the hole's axis, the connector may have an unthreaded, fully threaded, or a partially threaded opening, the connecting element may include an extension.

Another aspect of the invention involves a wheel. The wheel has an outer rim with a spoke bed wall having spoke holes and preferably a tire bed radially outboard of the spoke bed wall and lacking holes aligned with the spoke holes. Spokes couple the rim to the hub with connecting elements coupling the spokes to the rim. Each connecting element has a first portion (i.e. collar portion) extending within an associated spoke hole. An opening of each connecting element accommodates either an associated spoke or an intermediate element coupled to the associated spoke. The connecting element has a second portion (i.e. enlarged portion) radially outboard of the spoke bed and cooperating with an outboard surface of the spoke bed to prevent radially inward movement of the associated spoke and permitting tension in the spoke to be transferred to the rim. In various implementations, the connecting element may consist essentially of a multiplicity of discreet segments. The spoke or an intermediate element coupled to the spoke may have an overlie engagement with the connecting element. The spoke, or an intermediate element connected to the spoke, may serve to maintain the connecting element in its open or expanded orientation and thus maintain its engagement with the spoke bed wall. As disclosed herein, the connecting element may also be utilized to connect the spoke to a spoke bed of the hub shell in a manner similar to that described above.

Another aspect of the invention involves a wheel rim. The rim has a spoke bed with a number of spoke holes, commonly produced by drilling. A tire bed may be radially outboard of the spoke bed and may lack holes aligned with the spoke holes. Lateral walls extend radially outward from opposite sides of the tire bed and cooperate with the tire bed to form a tire well. The rim may be substantially unitarily formed from a light alloy (e.g., aluminum alloy) or a fiber composite or other material. A clincher tire may be mounted in the tire well advantageously in the absence of a separate tube. A valve may be sealingly mounted in a valve hole in the tire bed and extending through a valve hole in the spoke bed for inflating the tire.

The present invention provides a spoke connection that may be blindly installed in the spoke bed. The connector may be economically produced using conventional manufacturing methods. The connection is easy to install and is serviceable in the field. The connection may be designed to provide a clean appearance with enhanced aesthetics. The connector may be made of high strength material(s), such as fiber-reinforced plastic or metals. The connector may have a large overlap with the spoke bed for increased robustness of the connection. The connector may be designed to minimize the size of the hole in the spoke bed, thereby increasing the strength of the bracing element (i.e. rim or hub). The connector may eliminate the necessity of a rim strip or rim tape. The resulting spoke connection is exceptionally robust and supports substantial spoke tension forces.

In contrast to prior art UK Patent Application GB2479870A by Jonathan Thulbon the connecting element of the present invention is comprised of two or more discreet segments. These segments are not required to flex during installation with the spoke bed and thus may be constructed of stronger and stiffer material (such as fiber reinforced polymer or metal) for increased robustness of the spoke connection. Further, since the segments are discreet, they may be installed in the spoke bed in sequential assembly steps, where each segment is installed in separate assembly steps. This permits the segment to include a comparatively larger lateral overhang surface and a correspondingly larger lateral depth of lateral overlap and engagement between the connecting element and spoke bed, thus reducing stresses at this interface and further strengthening the spoke connection. Still further, the overlie engagement between the spoke (or an intermediate connecting element connected to the spoke) and the connecting element may be located longitudinally outwardly from the outboard surface of the spoke bed, which does not require any longitudinally outward extension portions. This permits the corresponding hole in his spoke bed to be comparatively smaller. This smaller hole serves to further strengthen the spoke bed in this highly-loaded area. Yet further, the lack of such extension portions also serves minimize the tensile and bending stress on the connecting element due to spoke tension forces, further strengthening the spoke connection. Further still, the option of a longitudinal engagement permits a comparatively larger surface area of engagement than a single engagement location, which reduces stresses on the connector and spoke and allows for a minimized connector geometry, which requires a smaller hole in the spoke bed.

BRIEF DESCRIPTION OF THE DRAWINGS

The present invention will be more readily understandable from a consideration of the accompanying drawings, wherein:

FIG. 5a is a partial exploded perspective view of a first embodiment of the present invention, with spoke bed in fragmentary view, describing a blind connection between the spoke and spoke bed, including a multi-piece expandable connector and a sleeve;

FIG. 5b is a perspective view, of the connector of the embodiment of FIG. 5a;

FIG. 5c is a partial exploded perspective view of the embodiment of FIG. 5a, describing a first assembly step between the connector and the spoke bed, with a first segment of the connector located within a hole of the spoke bed and engaged thereto;

FIG. 5f is an exploded cross section view, taken along 563-563, of the embodiment of FIG. 5a and corresponding to FIG. 5a;

FIG. 6b is a perspective view, of the connector of the embodiment of FIG. 6a;

FIG. 6f is an exploded cross section view, taken along 633-633, of the embodiment of FIG. 6a and corresponding to FIG. 6a;

FIG. 7a is a partial exploded perspective view of a third embodiment of the present invention, with spoke bed in fragmentary view and describing a blind connection between the spoke and the spoke bed, including a spoke nipple with ribs that engage and are located within a gap between the first and second segments of the connector;

FIG. 7b is a partial perspective view of the embodiment of FIG. 7a, showing the spoke bed in cross section, and showing the connector assembled to the spoke bed, with the spoke nipple engaged to the connector and the spoke connected to the spoke nipple;

FIG. 7c is an orthogonal view, showing the spoke bed in cross section along 635-635, of the embodiment of FIG. 7a, and corresponding to FIG. 7b;

FIG. 8a is a partial exploded perspective view of a fourth embodiment of the present invention, with spoke bed in fragmentary view and describing a blind connection between the spoke and the spoke bed, including a connector with step face;

FIG. 8b is a perspective view, of the connector of the embodiment of FIG. 8a;

FIG. 8c is a partial cross-sectional view, taken along 684-684, of the embodiment of FIG. 8a, describing a third assembly step, with a spoke assembled within an opening between the first and second segments;

FIG. 12a is a partial exploded perspective view of a eighth embodiment of the present invention, with spoke bed in fragmentary view, describing a blind connection between the spoke and spoke bed, including a spacer to be inserted within a gap between the segments of a connector;

FIG. 12b is a perspective view of the spacer of FIG. 12a;

FIG. 12c is a partial exploded perspective view of the embodiment of FIG. 12a, describing a final assembly step, with the spacer installed between the segments of the connector and a sleeve threadably assembled to the first and second connector segments, including a spoke connected to the sleeve;

FIG. 15b is an exploded cross section view, taken along 849-849, of the embodiment of FIG. 15a and corresponding to FIG. 15a;

FIG. 15c is a cross section view, taken along 849-849, of the embodiment of FIG. 15a, showing the segments as pre-assembled to the nipple;

FIG. 15d is a cross section view, taken along 849-849, of the embodiment of FIG. 15a, showing the pre-assembly of FIG. 15c as partially inserted through the hole of the spoke bed;

DETAILED DESCRIPTION OF THE INVENTION

Figure 1:
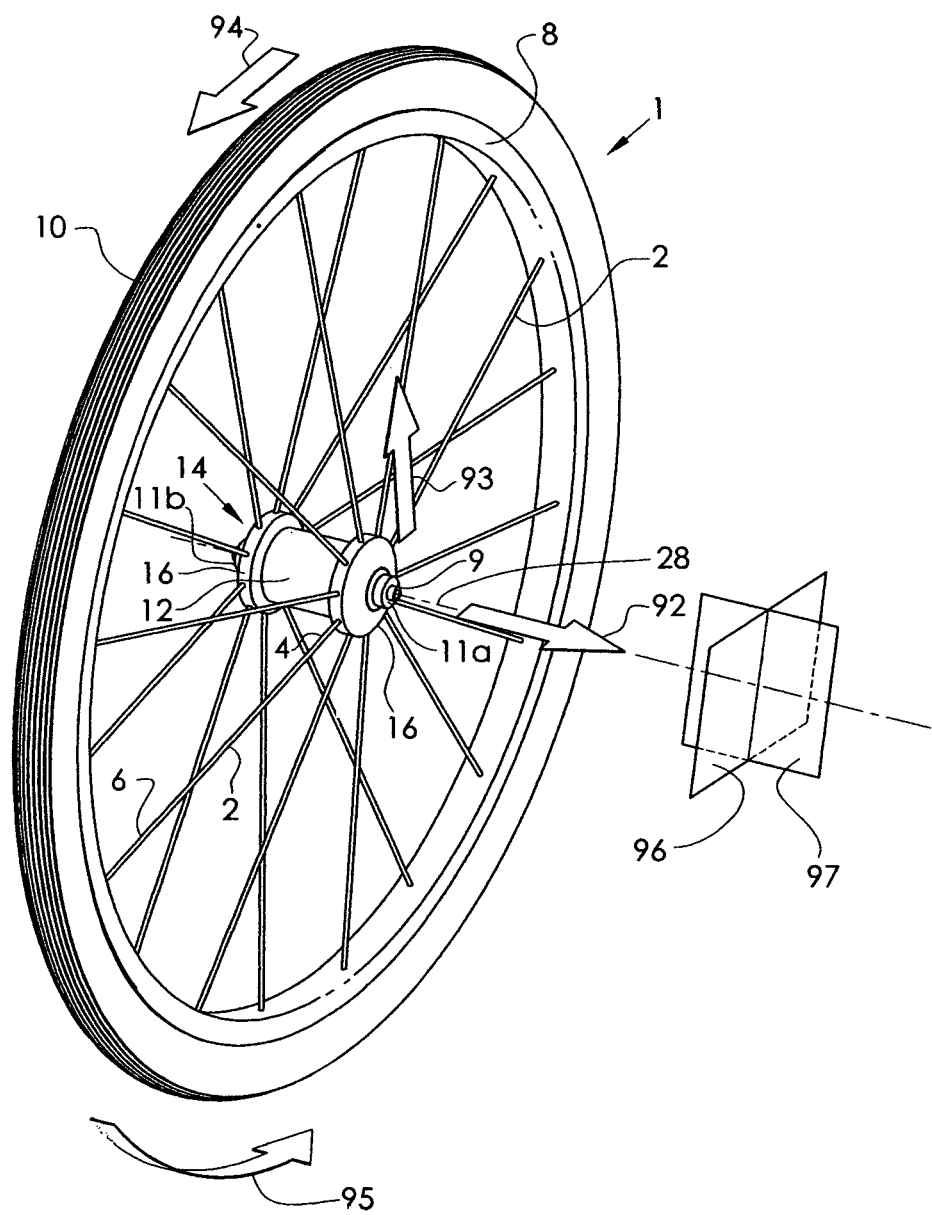
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the frame and the quick release skewer assembly are not shown in this figure. The hub shell 14 is rotatable about the axle 9 and includes at least two axially spaced hub flanges 16, each of which include a means for connecting with the spokes 2. Axle 9 includes end faces 11a and 11b that define the spacing of its mounting with the frame (not shown). The axial axis 28 is the axial centerline of rotation of the bicycle wheel 1. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis. An axially inboard orientation is an orientation that is axially proximal to the axial midpoint between the two end faces 11a and 11b. Conversely, an axially outboard orientation is an orientation that is axially distal to the axial midpoint between the two end faces 11a and 11b. An axially inwardly facing surface is a surface that faces toward the axial midpoint between the two end fades 11a and 11b. Conversely, an axially outwardly facing surface is a surface that faces away from the axial midpoint between the two end faces 11a and 11b. Similarly, an axially inward direction is a direction that extends toward the axial midpoint between the two end faces 11a and 11b. Conversely, an axially outward direction is a direction that extends away from the axial midpoint between the two end faces 11a and 11b. A radially inboard orientation is an orientation that is radially proximal to the axial axis 28 and a radially outboard orientation is an orientation that is radially distal to the axial axis 28.

While it is most common for the hub shell 14 to rotate about a fixed axle 9, there are some cases where it is desirable to permit the axle 9 to be fixed with the wheel 1, such as the case where the wheel 1 is driven by the axle 9.

Figure 2A:
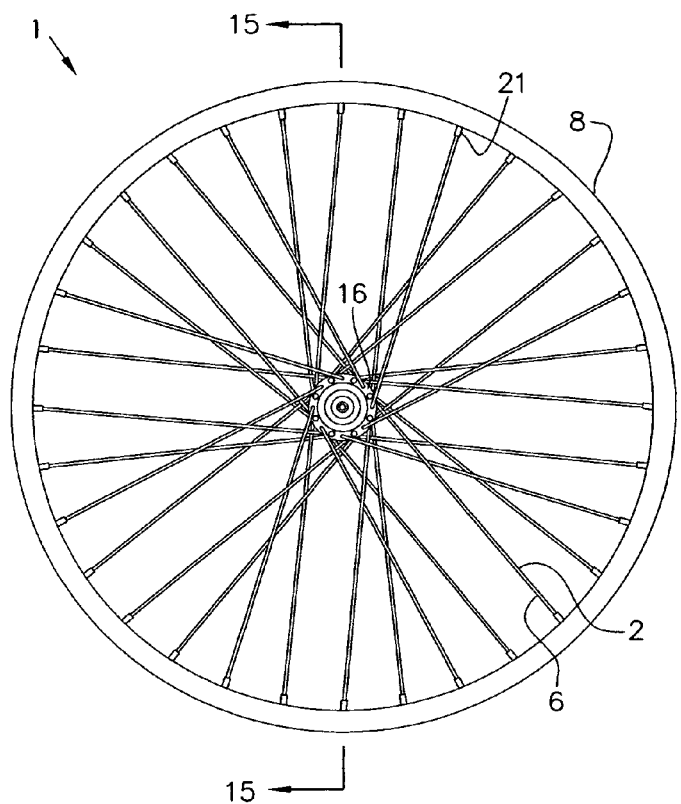
FIG. 2a is an axial plan view illustrating a prior art bicycle wheel.
Figure 2B:
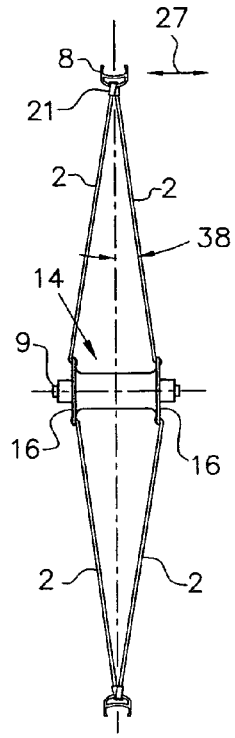
FIG. 2b is a cross-section view of the prior art bicycle wheel of FIG. 2a, as seen generally in the direction 15-15.
Figure 2C:
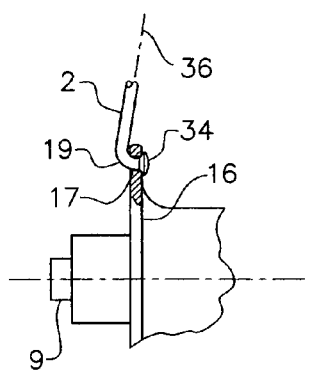
FIG. 2c is a fragmentary view detailing the view illustrated in FIG. 2b where the hub flange is shown in a partial cross-section to illustrate the connection with the spoke.

FIGS. 2a, 2b and 2c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The wheel is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16. The second end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are threadably tightened, the spokes are drawn up tight and a degree of pre-tension is induced in the spoke 2. By selectively adjusting this threaded engagement, the spoke pre-tension may be adjusted to align the trueness of the rim 8. The spoke pre-tension is resisted by circumferential compression of the rim 8 and it is this balance of forces that imparts efficient structural integrity to the bicycle wheel 1. Also shown in FIG. 2b is bracing angle 38 between the radial centerline plane of the rim 8 and the tensile axis 36 of the spokes 2. As this bracing angle 38 is increased, the lateral stiffness (i.e. stiffness in the axial direction 92) of the wheel 1 is also increased.

Figure 3A:
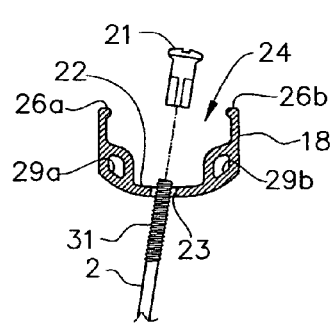
FIG. 3a is a partial radial cross-sectional view of a prior art single-wall rim.

FIG. 3a shows prior art single-wall rim 18 with a single lower web or spoke bed 22 wall. Rim 18 includes two hooked flanges 26a and 26b for capturing the bead of a tire (not shown). Tire well 24 is a circumferential channel bounded by spoke bed 22 and flanges 26a and 26b. Spoke 2 includes threaded end 31 for threadable engagement with spoke nipple 21. Rim 18 may be produced as an aluminum extrusion that also includes cavities 29a and 29b to accept pins (not shown) that serve to join the butted ends of the extruded profile to create a continuous rim hoop. During assembly, the threaded end 31 of spoke 2 is first positioned to extend through the inside diameter end of opening 23. Next, the nipple 21 may be threadably assembled to the threaded end 31 of the spoke 2 through the outside diameter end of opening 23. With all of the spokes 2 of the wheel assembled to the rim 18 in this way, a completed wheel assembly 1 is achieved. A rim strip (not shown) is commonly utilized to cover the radial outboard surface of the spoke bed and to protect the inner tube (not shown) from damage.

Figure 3B:
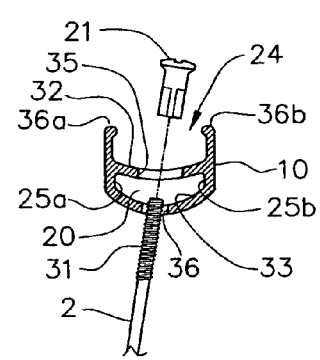
FIG. 3b is a partial radial cross-sectional view of a prior art double-wall rim.

FIG. 3b shows a prior art rim 20 of double-wall configuration with an upper web or tire bed 32 wall and a lower web or spoke bed 33 wall. Rim 10 includes two hooked flanges 36a and 36b for capturing the bead of a tire (not shown). Tire well 24 is a circumferential channel bounded by tire bed 32 and flanges 36a and 36b. Spoke bed 33 includes opening 36 and tire bed 32 includes concentric opening 35, which serve to accept a spoke 2 and spoke nipple 21. Spoke 2 includes threaded end 31 for threadable engagement with spoke nipple 21. Rim 18 is produced as an aluminum extrusion that also includes an internal cavity 20 bounded by the spoke bed 33, the tire bed 32 and sides 25. It may be seen that, during assembly, the threaded end 31 of spoke 2 is first positioned to extend through the inside diameter end of opening 35. Next, the nipple 21 is threadably assembled to the threaded end 31 of the spoke 2 first through opening 35 and then through opening 36. With all of the spokes 2 of the wheel assembled to the rim in this manner, a completed wheel assembly is achieved. It may be seen that, with the nipple 21 bearing against the spoke bed 32, opening 35 remains exposed as a passageway between the tire well 24 and the cavity 20. A rim strip (not shown) is commonly utilized to cover the radial outboard surface of the spoke bed and to protect the inner tube (not shown) from damage.

Figure 4:
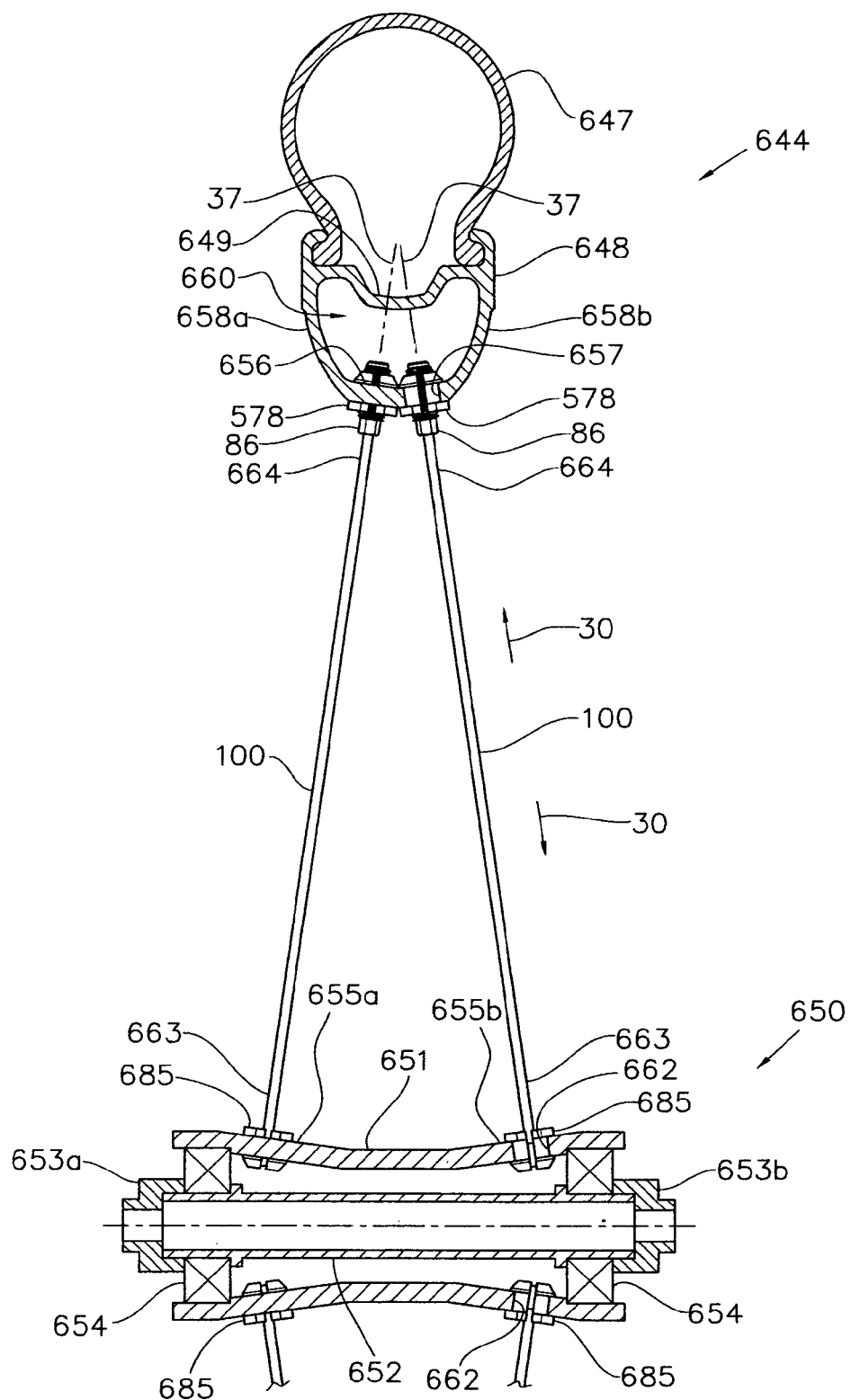
FIG. 4 is a cross-section view in the axial plane of a bicycle wheel, including an exemplary application of the present invention.

FIG. 4 shows an exemplary bicycle wheel 644 that corresponds to some of the embodiments described herein. This figure is shown to provide a generic assembly to illustrate an arrangement wherein the present invention may be adapted to utilization in bicycle wheel construction. The bicycle wheel 644 includes spokes 100, rim 648, hub assembly 650 and tire 647. The hub assembly 650 includes hub shell 651 with flange portions 655a and 655b, axle 652, axle caps 653a and 653b and bearings 654. The rim 648 includes tire bed 649 wall with geometry for mounting of a tire 647 and a spoke bed 656 wall with a multiplicity of spoke holes 657, each to accept an individual connector 578, and sidewalls 658a and 658b to define a cavity 660. Hub shell 651 includes flange portions 655a and 655b with a multiplicity of spoke holes 662, each to accept an individual connector 685.

It is noted that the rim 648 and hub shell 451 shown here are each exemplary representations of a bracing element that may take on a wide range of forms. The spokes 100 are connected at their first end 663 to flange portions 655a or 655b and at their second end 664 to the rim 648. Spokes 100 are connected to the rim 648 by means of sleeves 86 and connectors 578 as described in greater detail in FIGS. 5a-i and in other embodiments described herein. Spokes 100 are connected to the hub shell 651 by means of an overly connection between a spoke head portion 534 (not shown) and connectors 685 as described in greater detail in FIGS. 8a-c and other embodiments described herein. While the term "spoke bed" is commonly used in reference to the outer rim, as described herein, the term "spoke bed" may also refer to the portion of the hub shell to which the spoke is connected (i.e. flange portions 655a and 655b).

The spoke 100 is a generally long slender tensile element with a longitudinal axis 37 along its length and generally parallel to its sidewalls. The spoke 100 also has a terisile axis 36 of applied tensile load, which is generally collinear to the longitudinal axis. For the purposes of definition, the term "longitudinal" herein refers to alignment generally coincident or parallel to the longitudinal axis 37. Further, the term "lateral", as defined herein, refers to alignment and/or orientation in a direction that is generally orthogonal to the longitudinal axis 37.

The connectors 578 and 685 are generally shown to serve as terminations to the spoke 100 and provide means to connect or anchor the spoke 100 to a bracing element (i.e. rim 648 and/or hub shell 651). Note that the span of spoke 100 is aligned in the direction of spoke tension 30 and along the tensile axis 36, which extends through the longitudinal axis 37 of the spoke 100. It is shown here that several spokes 100 of the wheel 644 may be terminated in this manner. For simplicity in describing many of these embodiments, a rim connection arrangement may be described, with the understanding that such an embodiment may be easily adapted to hub connections as well. It is understood that FIG. 4 corresponds to a simplified arrangement for illustration purposes. Several of the embodiments of the present invention may be applied to this arrangement, as well as arrangements which include facility for creating and/or adjusting spoke pre-tension, as described in FIGS. 5a-i.

The present invention comprises a spoke (i.e. spoke 100), which may be considered as a longitudinal tensile element having an end portion and a cross-section thereof, a connecting element (i.e. connectors 578 and 685), a bracing element (i.e. hub shell 651 and rim 648), and a tensile axis of applied tensile load along the longitudinal tensile element. The spoke is connected to the connecting element by means of an overlie engagement and/or a longitudinal engagement between the spoke (and/or an intermediate element connected to the spoke) and the connecting element. In the embodiments shown herein, the longitudinal tensile element is a vehicle wheel spoke, the hub shell or hub flange constitutes a first bracing element and the outer rim constitutes a second bracing element.

A longitudinal tensile element (i.e. spoke) is a generally long slender element, with a length greater than its cross sectional width, and with a longitudinal axis 37 extending generally along its length. The spoke includes external sidewall surface(s) that extend generally along its length. As such, the longitudinal axis 37 is generally parallel to the sidewall surface. The tensile axis 36 is the axis along which tensile loads (i.e. spoke tension 30) are applied to the tensile element, and is commonly collinear with the longitudinal axis 37, particularly in the region of the structural span of the spoke. For the purposes of explanation herein, the term "longitudinal axis" is generally interchangeable with the term "tensile axis" unless otherwise noted. Some examples of a longitudinal tensile element include the spoke of a vehicle wheel, a guy wire, a control cable, or a tendon. In most of the embodiments of the present invention, the longitudinal tensile element is capable of supporting load in tension, otherwise known as positive tensile loading, along its length. However, the longitudinal tensile element may alternatively support load in compression along its length, otherwise known as negative tensile loading, where the longitudinal tensile element provides columnar support between two bracing elements. The spoke span is considered as the portion of the spoke that is under tension (or compression) and that extends between its anchor points and/or engagements at the bracing elements (i.e. hub and rim). A location outboard of the spoke span is a location along the tensile axis 36 that is beyond or external to the spoke span. Further, a longitudinally outward orientation refers to an orientation along the longitudinal axis that is distal from the midpoint of the span. Conversely, a longitudinally inward orientation refers to an orientation along the longitudinal axis that is proximal to the midpoint of the span.

For the purposes of using conventional terminology, the term "hub flange" is used herein to describe a region of the hub shell to which the spokes are joined. While the surface of the hub flange may be raised and flange-like in comparison to other surfaces of the hub shell 14, this is not a requirement for the present invention and the hub flange may alternatively be flush or recessed relative to other hub shell surfaces. An overlie engagement between two elements is an engagement wherein a first element includes a laterally extending surface that extends generally laterally from the direction of load. This laterally extending surface overlaps or overlies a mating surface or edge of the second element such that the first element is engaged and connected to the second element in the direction of load. The overlie engagement is preferably capable of supporting this load and maintaining this connection.

It may be termed that a longitudinal engagement is an engagement that includes a continuous longitudinal engagement interface or an engagement that includes at least two engagement interface locations that are longitudinally spaced along the longitudinal axis of the spoke. It is generally desirable that the longitudinal length of such an engagement be greater than the cross-sectional thickness of the spoke to create an effective engagement. Obviously, increasing the length of engagement may serve to increase the interface surface area and may therefore increase the load carrying capacity of a corresponding joinder between the connector and the spoke. A threaded engagement, with its continuous helix of engagement along a longitudinal length, is considered to be a longitudinal engagement.

A bracing element is one that resists or braces against all or part of the load of a tensile element. In other words, in order for a tensile element (i.e. spoke) to maintain its tension (or compression) and remain a generally static structure, it must have a resisting or bracing element to bear against. Thus, the tensile element is generally anchored to two bracing elements and the tensile element thereby serves to connect the two bracing elements to each other. In an example where the tensile element is generally held in tension, such as the spoke of a tension-spoke vehicle wheel, a first bracing element could be the hub flange and a second bracing element could be the outer rim hoop. Similarly, in the case where the tensile element is generally held in compression, such as the spoke of a compression-spoke vehicle wheel, the bracing element is that element which the tensile element is pushed against.

The term "blind connection" or "blind engagement" is well known in industry and refers to a connection between a first and second element where the first element may be connected to the second element without necessarily requiring access to both sides of the second element. For example, in a blind connection, a spoke may be connected to a hole in a rim by manipulating the spoke (or a connector associated with the spoke) through the first end of the hole without requiring access to the opposite end of this hole. Such a blind connection is particularly useful when access to the opposite end of the hole is limited or restricted or when the opposite end of the hole is otherwise obscured. As an example relating to several of the embodiments of the present invention, a blind connection between the spoke and the spoke bed is shown to be achieved by means of access only to the opening of the hole at the inboard surface of the spoke bed and without requiring access to the outboard surface of the spoke bed. As such, the blind connection provided by the present invention is particularly advantageous since the connection between the spoke and the spoke bed may be achieved by means of assembly and manipulation only through the accessible exterior of the bracing element and does not require access to the inaccessible interior of the bracing element. Such a blind connection has particular utility in double-wall rims for tubeless tires where the tire bed wall may advantageously remain unpierced to provide effective sealing of the internal cavity of the tire. This unpierced tire bed wall serves to obscure the longitudinally outward end of the hole in the spoke bed.

Figure 5D:
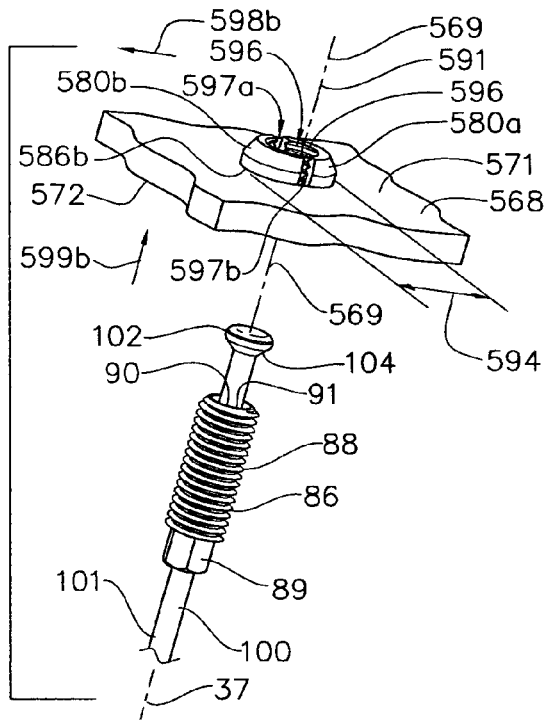
FIG. 5d is a partial exploded perspective view of the embodiment of FIG. 5a, describing a second assembly step between the connector and the spoke bed, with a second segment of the connector located within a hole of the spoke bed and engaged thereto.
Figure 5E:
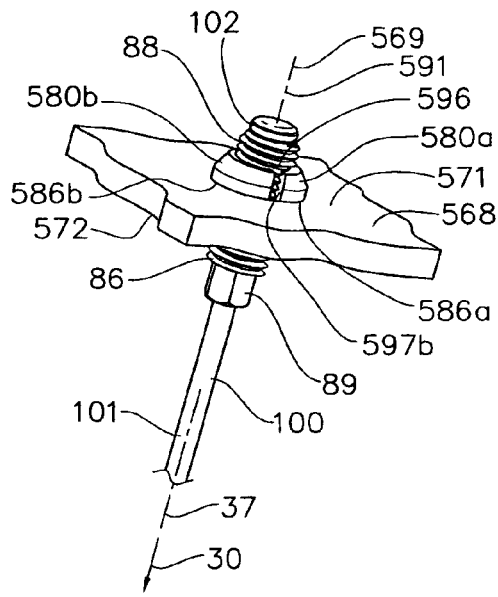
FIG. 5e is a partial perspective view of the embodiment of FIG. 5a, describing a third assembly step, with a sleeve threadably assembled to the first and second connector segments, including a spoke connected to the sleeve.
Figure 5F:
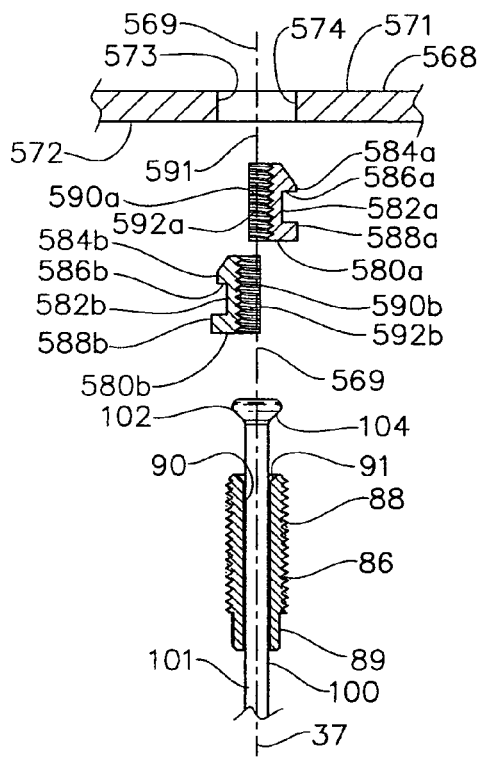

FIGS. 5a-i describe an embodiment illustrating a blind connection between the spoke and the spoke bed, showing the spoke bed 568, connector 578, sleeve 86 and spoke 100. As shown in FIGS. 5a and 5f, spoke bed 568 includes a radially outboard surface 571, a radially inboard surface 572. Spoke bed 568 also includes a hole 573 therethrough with hole sidewall 574 and circular diameter 575. Hole 573 extends along central axis 569, which is shown here to be generally perpendicular to the outboard surface 571. Spoke bed 568 is shown in fragmentary view for illustration purposes and it is understood that spoke bed 568 constitutes a portion of the rim or hub flange to which the connector 578 is attached. The outboard surface 571 represents a longitudinally outward surface adjacent the longitudinally outward opening of hole 573. Similarly, the inboard surface 568 represents a longitudinally inward surface adjacent the longitudinally inward entrance or opening of hole 573. While these surfaces are shown to be generally flat, planar, and orthogonal to the central axis 569, this is merely a representative arrangement and these surfaces may incorporate a wide range of geometries, including curved geometry, stepped geometry, projecting surfaces, recessed surfaces, conical, spherical, etc.

Spoke 100 includes a shank portion 101 extending along longitudinal axis 37, an enlarged head 102 and a laterally projecting transition surface 104 therebetween. Sleeve 86 includes external threads 88, a longitudinal hole 90 therethrough, and countersink 91 matched to nest with transition surface 104. Sleeve 86 also includes flats 89 to create a non-circular portion that may be manually manipulated with a wrench (not shown). The spoke 100 is shown in FIGS. 5a and 5f to be loosely preassembled to the sleeve 86, with the shank portion 101 extending through the hole 90 along the longitudinal axis 37.

As particularly illustrated in FIG. 5b, connector 578 is a multi-piece connector consisting of individual segments 580a and 580b, each include associated flange portions 588a and 588b with flats 589, collar portions 582a and 582b, enlarged portions 584a and 584b, ramped surfaces 587a and 587b and overhang surfaces 586a and 586b respectively. Segments 580a and 580b also include semi-circular cylindrical reliefs 590a and 590b respectively, with corresponding internal thread portions 592a and 592b that extend along opening axis 591. As particularly shown in FIG. 5h, collar portions 582a and 582b have a width 593 across their external surfaces and enlarged portions 584a and 584b have a width 594 across their outer surfaces, with overhang surfaces 586a and 586b having widths 595a and 595b respectively. Cylindrical reliefs 590a and 590b extend longitudinally along the opening axis 591 through their flange portions 588a and 588b, collar portions 582a and 582b, and enlarged portions 584a and 584b respectively. Connector 578 is shown in greater detail in FIG. 5b. Segment 580a is shown to be in a generally laterally opposed orientation relative to segment 580b, with reliefs 590a and 590b facing each other. It is envisioned that the connector 578 may be made of a wide range of materials, including a polymeric resin, fiber-reinforced polymeric resin, aluminum, magnesium, zinc or a variety of other materials. In a preferred arrangement, the segments 580a and 580b may be made of fiber reinforced polymer, with the sleeve made of aluminum and the spoke made of stainless steel. The design of segments 580*a* and 580*b* is such that they may be easily formed in a variety of conventional manufacturing processes, including molding, casting, forging, etc.

Figure 5G:
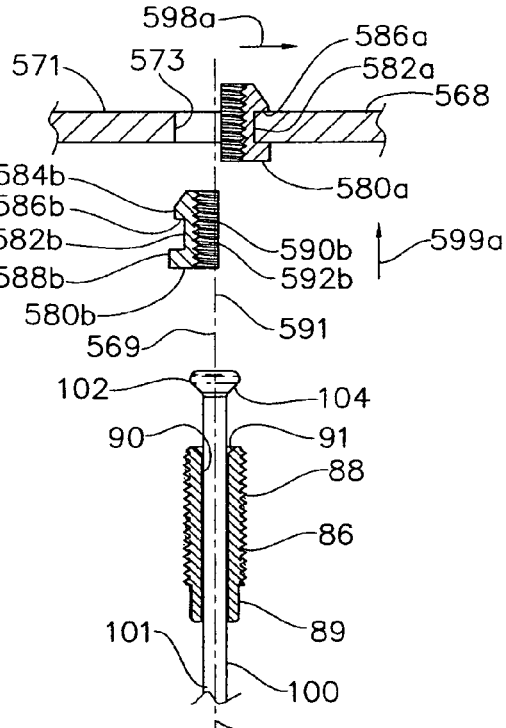
FIG. 5g is an exploded cross section view, taken along 563-563, of the embodiment of FIG. 5a and corresponding to FIG. 5c.

FIGS. 5*c* and 5*g* show a first assembly step in connecting the spoke 100 to the spoke bed 568. Segment 580*a* is first shown to be pre-assembled to the hole 573, first in direction 599*a*, which is a generally longitudinal direction, until overhang 586*a* is aligned with outboard surface 571, then in direction 598*a* until collar portion 582*a* is contacting and nested within sidewall 574 and longitudinally overlapping the sidewall 574. Direction 598*a* is a generally lateral direction relative to direction 599*a* and serves to laterally shift and spread segment 508*a* in a distal orientation relative to the central axis 569. Flange portion 588*a* is now abutting inboard surface 572 and overhang surface 586*a* is overlying, hooking and engaged to outboard surface 571. It is noted that, as segment 580*a* is inserted through hole 573, with enlarged portion 584*a* aligned with hole sidewall 574, segment 580*a* is in a laterally contracted orientation that is proximal to segment 580*b*. Then, when segment 580*a* is shifted in direction 598*a*, it achieves a laterally expanded orientation that is laterally distal to segment 580*b*. It is noted that the sidewall 574 serves to provide a limit stop to control the lateral displacement of the collar portions 582*a* and 582 in directions 598*a* and 598*b* respectively.

Figure 5H:
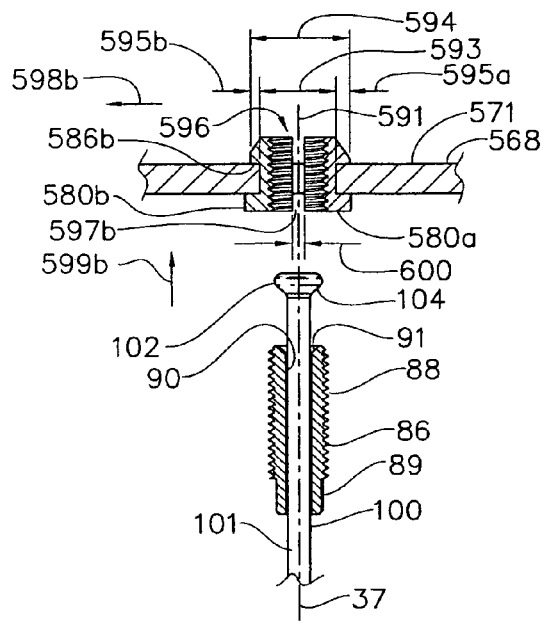
FIG. 5h is a cross section view, taken along 563-563, of the embodiment of FIG. 5a and corresponding to FIG. 5d.

FIGS. 5*d* and 5*h* show a second assembly step in connecting the spoke 100 to the spoke bed 568. Segment 580*b* is next shown to be inserted within the hole 573, first in direction 599*b*, which is a generally longitudinal direction, until overhang surface 586*b* is aligned with outboard surface 571, then laterally shifted in direction 598*b* until collar portion 582*b* is contacting and nested within sidewall 574 and longitudinally overlapping the sidewall 574. Direction 598*b* is a generally lateral direction relative to direction 599*b* and serves to laterally shift and spread segment 508*b* in a distal orientation relative segment 508*a* and to the central axis 569. Flange portion 588*b* is now abutting inboard surface 572 and overhang surface 586*b* is overlying, hooking and engaged to outboard surface 571. It is noted that, as segment 580*b* is inserted through hole 573, with enlarged portion 584*b* aligned with hole sidewall 574, segment 580*b* is in a laterally contracted or collapsed orientation that is proximal to segment 580*a*. Then, when segment 580*b* is shifted in direction 598*b*, it achieves a laterally expanded orientation that is laterally distal to segment 580*a*. Segments 580*a* and 580*b* are now preassembled to the spoke bed 568.

With segments 580*a* and 580*b* opposed and fully seated in respective directions 598*a* and 598*b* as shown, gaps 597*a* and 597*b* are created at the seam between the two segments. These gaps 597*a* and 597*b* are necessary to provide the requisite clearance to allow segment 580*b* to collapse against segment 580*a* and to permit enlarged portion 584*b* to clear the hole 573 during the second assembly step. Thus, the connector 578 may achieve an unexpanded or collapsed orientation such that width 594 is reduced to allow the enlarged portions 584*a* and/or 584*b* to pass through the hole 573 as described in these figures. Further, the connector 578 may achieve an open, spread or expanded orientation such that width 594 is expanded to the extent that collar portions 582*a* and 582*b* are fully nested and seated against sidewall 574 and overhang surfaces 586*a* and 586*b* overlie the outboard surface 571 as shown. FIGS. 5*d* and 5*h* show the segments 580*a* and 580*b* as expanded and spread apart in directions 598*a* and 598*b* respectively.

It is preferable that the overhang surfaces 586*a* and 586*b* be generally matched to the outboard surface 571 in a surface-to-surface overlie engagement. This maximizes the area of contact and minimizes the contact stress at this engagement interface. Alternatively, the overhang surfaces 586*a* and 586*b* may contact only an edge of the spoke bed 568, such as the longitudinally outward edge of the hole 573, in a surface-to-edge overlie engagement. Such an engagement has comparatively reduced contact area and results in higher contact stress.

As described in FIGS. 5*a-i*, segment 580*a* is installed and inserted in the hole 573 in a first assembly step and segment 580*b* is installed and inserted in the hole 573 in a second assembly step. This multi-step sequence may be considered "sequential" installation of the segments. Since segment 580*a* is installed alone in the first assembly step, it may permit a relatively large width 595*a* of overhang surface 586*a* to the extent that it may still fit and permit installation within the hole 573. As shown in FIG. 5*h*, the width 595*a* of overhang surface 586*a* is larger than the width 595*b* of overhang surface 586*b*. Since the width 595*a* is maximized for sequential installation, when the enlarged portion 584*a* is advanced in direction 599*a* such that enlarged portion 584*a* is aligned with sidewall 574, then the hole 573 may be blocked to a degree that segment 580*b* may be temporarily restricted from simultaneously advancing through hole 573.

The lateral shift of segment 580*a* in direction 598*a*, as shown in FIG. 5*g* corresponds to this larger width 595*a*. With the segment 580*a* already in place, only a narrower portion of the hole 573 remains available for installation of segment 580*b* as shown in FIGS. 5*c* and 5*g* and as described in the second assembly step. Thus, the available width 595*b* of overhang surface 586*b* is often more limited and reduced relative to the larger width 595*a*. To maximize width 595*b*, segment 580*b* is preferably pressed against segment 580*a* during its installation and fitment within hole 573 in direction 599*b* as described. When segment 580*b* is then shifted in direction 598*b*, gaps 597*a* and 597*b* are created (as shown in FIGS. 5*d* and 5*h*), whose width 600 generally corresponds to the width 595*b* of overhang surface 586*b*. It may likely be preferable to minimize the width 600 of gaps 597*a* and 597*b* while maximizing the width 595*b* to increase the robustness of the overlie engagement and connection between the connector 578 and the spoke bed 586.

One of the advantages of the present invention is that its discreet segments (580*a* and 580*b*) may accommodate such sequential installation. However, as an alternative, both segments 580*a* and 580*b* may be installed through hole 573 at the same time. Such a single-step assembly sequence may be considered "simultaneous" installation. In such a case, both segments 580*a* and 580*b* must be fitted within hole 573 at the same time, necessitating that widths 595*a* and 595*b* be reduced. Thus, in such simultaneous installation, even if segments 580*a* and 580*b* are fully collapsed and pressed against each other during installation, the width 600 of gaps 597*a* and 597*b* generally corresponds to the combined widths 595*a* and 595*b* of overhang surfaces 586*a* and 586*b*. In sequential installation, both enlarged portions 584*a* and 584*b* must clear the sidewall 574 simultaneously during installation. Thus, in contrast to sequential installation, simultaneous installation results in more challenging geometry restrictions that reduce the clearance and space available to accommodate widths 595*a* and 595*b* and also may require increased width 600 of gaps 597*a* and 597*b*. Since it is often preferable to maximize widths 595*a* and 595*b* and to minimize width 600 to maximize the robustness of the connection between the connector 578 and the spoke bed 568, it may be seen that sequential installation may be preferable to simultaneous installation.

Further, with segments 580*a* and 580*b* fully seated in hole 573 as shown in FIGS. 5*d* and 5*h*, cylindrical reliefs 590*a* and 590*b* combine to create a generally circular cylindrical opening 596 that extends in a generally longitudinal direction along opening axis 591. It is noted that the central opening 596 and gaps 597*a* and 597*b* all constitute portions of a general opening between segments 580*a* and 580*b*. Internal thread portions 592*a* and 592*b* are now matched and combined to create a continuous helical internal thread profile that may threadably engage with the external threads 88 of the sleeve 86. Also, it may be seen that the flange portions 588*a* and 588*b* combine to create a generally hexagonal and non-circular profile that includes flats 589 such that it may be manually manipulated with a wrench (not shown).

Flange portions 588*a* and 588*b* preferably include laterally projecting geometry that is sized to extend outside the perimeter of hole 573 and to laterally overlie the inboard surface 572 adjacent the hole 573. Thus, by contacting and abutting the inboard surface 572, the flange portions 588*a* and 588*b* may serve to provide a depth stop to their respective segments 580*a* and 580*b*, limiting their advancement in respective directions 599*a* and 599*b* during assembly to insure proper alignment between overhang surfaces 586*a* and 586*b* and outboard surface 571. Further, the overlie of the flange portions 588*a* and 588*b* may serve to retain the segments 580*a* and 580*b* to the hole 573, thus preventing them from inadvertently advancing too far beyond the outboard surface 571 and potentially becoming lost and disengaged with the spoke bed 568. While flange portions 610*a* and 610*b* provide the convenience of a depth stop and provide the convenience for manual manipulation as described, it is understood that these functions may not be critical for proper function of the corresponding segments 580*a* and 580*b* and that flange portions 588*a* and 588*b* may alternatively be omitted and/or may have an alternate geometry form.

Figure 5I:
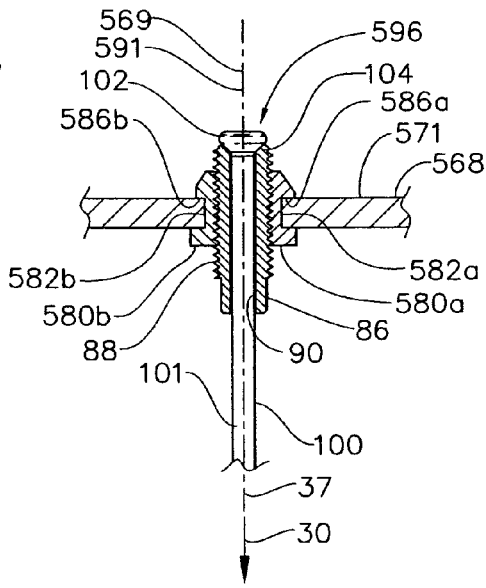
FIG. 5i a cross section view, taken along 563-563, of the embodiment of FIG. 5a and corresponding to FIG. 5e.

FIGS. 5*e* and 5*i* show a third assembly step in connecting the spoke 100 to the spoke bed 568. The sleeve 86 is threadably engaged with the opening 596 created between segments 580*a* and 580*b*, with external threads 88 threadably engaged with internal thread portions 592*a* and 592*b*. It is shown here that opening axis 591 is generally parallel and coaxial with central axis 569. Alternatively, opening axis 591 may be offset parallel or at an angle relative to central axis 569.

The opening 596 of the connector 578 is now essentially plugged and filled by the sleeve 86, thus providing a bracing and blocking engagement between the cylindrical reliefs 590*a* and 590*b* to limit the laterally proximal or inward movement of the segments 580*a* and 580*b* and thus preventing the connector 578 from inadvertently achieving an unexpanded or collapsed orientation. The segments 580*a* and 580*b* are now locked in their expanded or open and spread orientation relative to each other. Thus, the overlie engagement between the overhang surfaces 586*a* and 586*b* and the outboard surface 571 is now maintained by the sleeve 86, thereby locking and engaging the connector 578 to the spoke bed 568. Further, the sleeve 86 is now threadably engaged to the connector 578 in a longitudinal engagement that occurs over at least a portion of the longitudinal length of the opening 596. This longitudinal engagement is particularly advantageous for several reasons: Firstly, since the engagement extends along the collar portions 582*a* and 582*b*, enlarged portions 584*a* and 584*b*, and flange portions 588*a* and 588*b*, this threaded engagement serves to longitudinally engage segments 580*a* and 580*b* to each other; Secondly, the lateral width of the engagement is minimized since cumulative lateral engagement width of the full thread helix results in a significant projected area of overlie engagement that is equivalent to the area of a much larger lateral overlie width in a single overlie engagement.

Finally, as spoke tension 30 is applied to the spoke 100 along tensile axis 36, the spoke 100 is drawn longitudinally inwardly and the transition surface 104, which may be considered to be a laterally projecting surface, is nested within the countersink 91 in an overlie engagement. Thus the spoke 100 is connected and engaged with the sleeve 86, which is connected and engaged to the connector 578, which is connected and engaged to the spoke bed 568. It should be noted that the sleeve 86 serves as an intermediate connecting element between the spoke 100 and the connector 578. These connections and engagements effectively join the spoke 100 to the spoke bed 568 to resist spoke tension 30. Thus, a blind connection between the spoke 100 and the spoke bed 568 is achieved. This blind connection is achieved through manipulation of the spoke 100, connector 578 and sleeve 86 only on the inboard surface 572 side of the spoke bed 568, without requiring access to the outboard surface 571 side of the spoke bed 568. It may be seen that the present invention provides particular advantage in the spoke bed of a tubeless tire rim application, since the sealed tire bed (not shown) is not required to be pierced and may now be used as a sealing air barrier.

Since a portion of internal thread portions 592*a* and 592*b* extend longitudinally through the corresponding enlarged portions 584*a* and 584*b*, a portion of their threaded engagement with external threads 88 is shown to be longitudinally outward of the overhang surfaces 586*a* and 586*b*. Thus, the a portion of the overlie engagement between the collar 86 and the connector 578 is longitudinally outward of the outboard surface 571 as well. This is preferable, since it serves to provide increased support and reduced stress in the connector 578.

The spoke tension 30 pre-load may be adjusted as previously described by threadably adjusting the external threads 88 relative to the internal thread portions 592*a* and 592*b* by means of a wrench (not shown) engaged to flats 89. This rotation of the sleeve 86 may be independent of the rotation of the spoke 100 about the longitudinal axis 37, with the sleeve 86 rotating relative to spoke 100. Alternatively, the spoke 100 may be rotationally fixed to the sleeve 86, such that the spoke rotates with the sleeve 86 about the longitudinal axis 37. Further, the connector 66 may be prevented from inadvertently rotating during this adjustment by means of a wrench (not shown) engaged with flats 589. Alternatively, the sleeve 86 may be held fixed, while the connector 578 is rotated relative to the sleeve 86 about the opening axis 591.

The spoke 100 and connector 578 may be disassembled in the reverse of the three assembly steps just described. First, the sleeve 86 is unscrewed from the connector 578. Second, the segment 580*b* is collapsed against segment 580*a* in direction 598*a*, reducing or eliminating gaps 597*a* and 597*b*. Overhang surface 586*b* is no longer overlying outboard surface 571 and segment 580*b* may be withdrawn from hole 573 in a longitudinally inward direction opposite direction 599*b*. Third, segment 580*a* is laterally shifted in direction 598*b* such that overhang surface 586*a* is no longer overlying outboard surface 571. Segment 580*a* may now be withdrawn from hole 573 in a direction opposite direction 599*a*.

Since light weight and low cost of the connector 578 are desirable attributes, it is preferable that the segments 580*a* and 580*b* be formed from a polymeric material, such as an engineering thermoplastic, or from a light metal, such as aluminum. However a wide range of other materials may be utilized to produce the connector 578.

While opening 596, comprised of cylindrical reliefs 590a and 590b, include internal thread portions 592a and 592b that extend the full longitudinal length of the connector 578, it is also envisioned that cylindrical reliefs 590a and/or 590b may alternatively include thread portions that extend along only a portion of the longitudinal length. Further, while cylindrical reliefs 590a and 590b are shown to include pre-formed internal thread portions 592a and 592b, it is also envisioned that the cylindrical reliefs 590a and 590b may alternatively be smooth. In this case, as the sleeve 86 is forcibly threaded into the opening 596, the external threads 88 may form internal threads in the formerly smooth cylindrical reliefs 590a and 590b in a self-tapping arrangement well known in industry. Further still, if cylindrical reliefs 590a and 590b were alternatively formed to be smooth and unthreaded, internal thread portions 592a and 592b may be formed in a conventional tapping operation subsequent to the installation of segments 580a and 580b. Still further, while connector 578 is shown to be composed of two discreet and opposed segments 580a and 580b, it is also envisioned that the connector may alternatively be composed of three or more discreet segments.

FIGS. 6a-j describe an embodiment illustrating a blind connection between the spoke 394 and the spoke bed 568, showing the connector 606, spoke bed 568, nipple 386 and spoke 394. Nipple 386 is of generally conventional configuration and includes a shank portion 388, an enlarged head portion 393 of diameter 398, and a transition surface 392 therebetween, and flats 389 such that it may be manually manipulated with a wrench (not shown). Transition surface 392 is shown here to be a generally planar and laterally projecting surface, extending perpendicular to the longitudinal axis 37. Nipple 386 also includes longitudinal hole 390 therethrough with internal threads 391 to threadably mate with external threads 395 of spoke 394. Spoke 394 includes an end portion 396 with external threads 395. The spoke 394 is shown in FIG. 5a to be threadably preassembled to the nipple 386, with external threads 395 mated to internal threads 391 and with the end portion 396 extending through the hole 390 along the longitudinal axis 37.

Spoke bed 568 is identical to that shown in FIGS. 5a-i and is shown in fragmentary view for illustration purposes. Spoke bed 568 constitutes a portion of the rim or hub flange to which the connector 606 is attached. Connector 606 is a multi-piece connector consisting of segments 608a and 6080b, each include associated flange portions 610a and 610b with flats 611, collar portions 612a and 612b, enlarged portions 614a and 614b, end faces 617a and 617b, and overhang surfaces 616a and 616b respectively. Segments 608a and 608b also include semi-circular cylindrical reliefs 618a and 618b respectively. Cylindrical reliefs 618a and 618b extend longitudinally along the opening axis 622 through their flange portions 610a and 610b, collar portions 612a and 612b, and enlarged portions 614a and 614b respectively. Connector 606 is shown in greater detail in FIG. 6b.

Figure 6A:
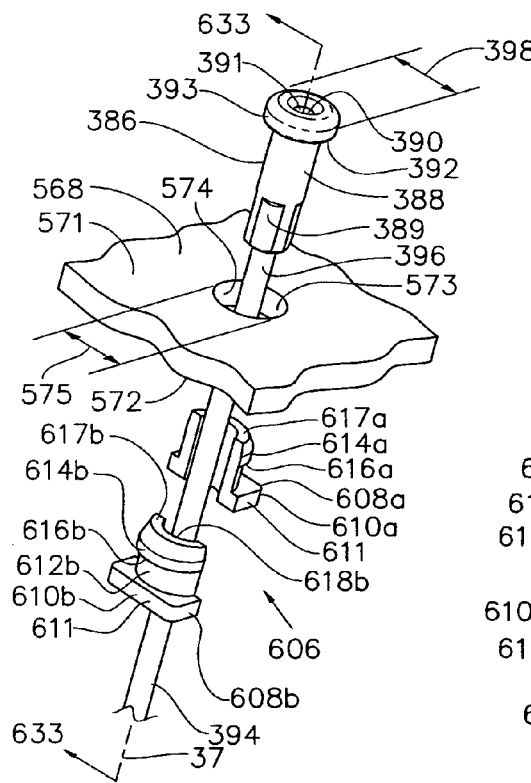
FIG. 6a is a partial exploded perspective view of a second embodiment of the present invention, with spoke bed in fragmentary view, describing a blind connection between the spoke and the spoke bed, including a multi-piece expandable connector and a spoke nipple.
Figure 6B:
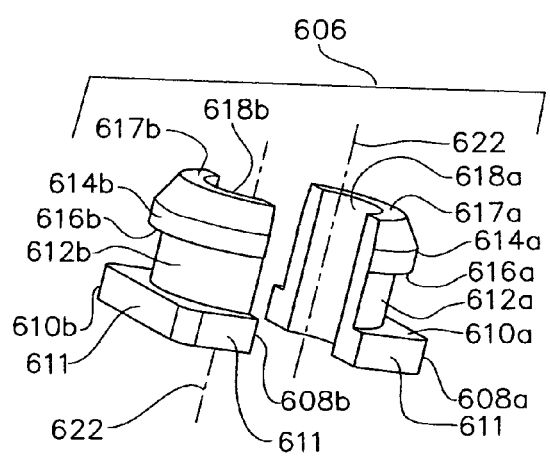
Figure 6C:
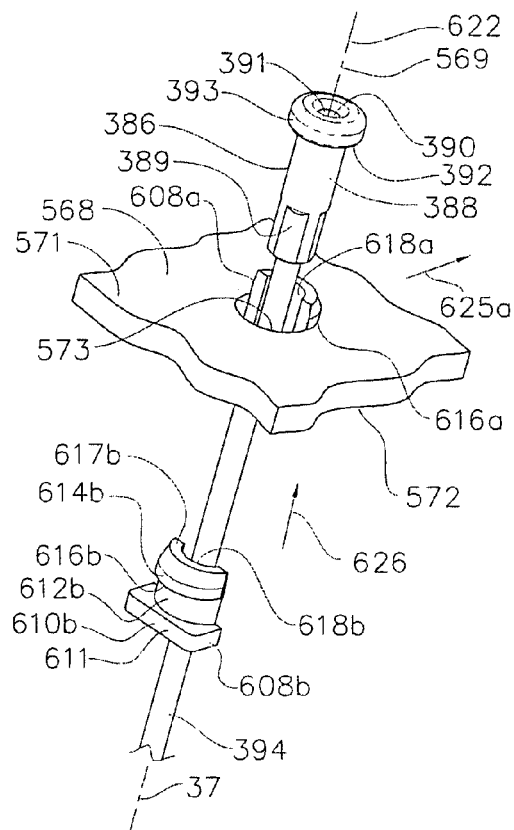
FIG. 6c is a partial perspective view of the embodiment of FIG. 6a, describing a first assembly step between the connector and the spoke bed, with a first segment of the connector located within a hole of the spoke bed and engaged thereto.
Figure 6D:
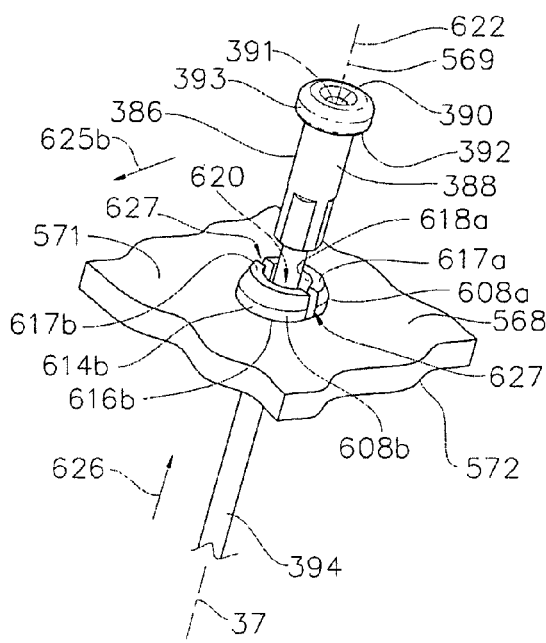
FIG. 6d is a partial perspective view of the embodiment of FIG. 6a, describing a second assembly step between the connector and the spoke bed, with a second segment of the connector located within a hole of the spoke bed and engaged thereto.
Figure 6E:
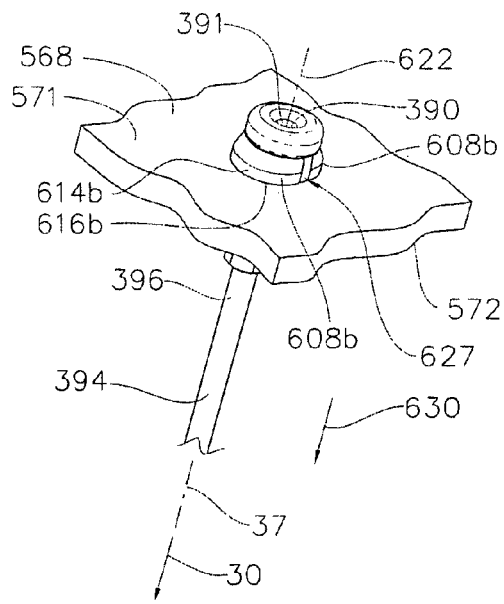
FIG. 6e is a partial perspective view of the embodiment of FIG. 6a, describing a third assembly step, with a nipple assembled within an opening between the first and second segments, including a spoke connected to the nipple.
Figure 6F:
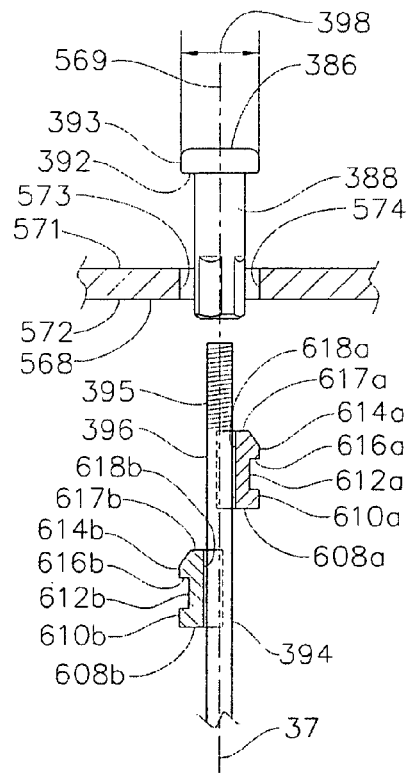
Figure 6G:
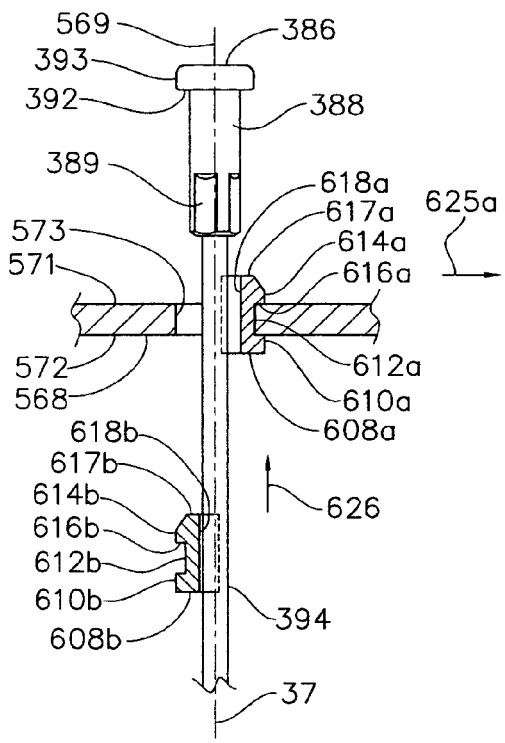
FIG. 6g is a cross section view, taken along 633-633, of the embodiment of FIG. 6a and corresponding to FIG. 6c.

FIGS. 6c and 6g show a first assembly step in connecting the spoke 394 to the spoke bed 568. Segment 608a is first shown to be pre-assembled to the hole 573, first in direction 626 until overhang surface 616a is aligned with outboard surface 571, then in direction 625a until collar portion 612a is nested within sidewall 574. Flange portion 610a is now abutting inboard surface 572 and overhang surface 616a is overlying, hooking and engaged to outboard surface 571. It is noted that, as segment 608a is inserted through hole 573, with enlarged portion 614a longitudinally overlapping with hole sidewall 574, segment 608a is in a laterally contracted orientation that is proximal to segment 608b. Then, when segment 608a is shifted in direction 625a, it achieves a laterally expanded orientation that is laterally distal to segment 606b.

Figure 6H:
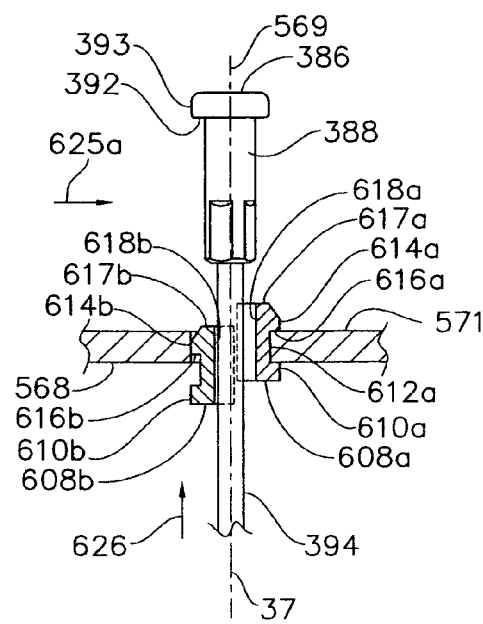
FIG. 6h is a cross section view, taken along 633-633, of the embodiment of FIG. 6a, corresponding to an intermediate assembly step between FIG. 6c and FIG. 6d, showing the second segment as closed or collapsed relative to the first segment and partially inserted within a hole of the spoke bed.

FIG. 6h shows the initiation of a second assembly step where the segment 608b is laterally collapsed and contracted in direction 625a toward the previously installed segment 608a to permit enlarged portion 614a to clear the hole 573 as the segment is advanced in direction 626 during this assembly step. Enlarged portion 614b is shown to be longitudinally overlapping hole sidewall 574 along the central axis 569.

Figure 6I:
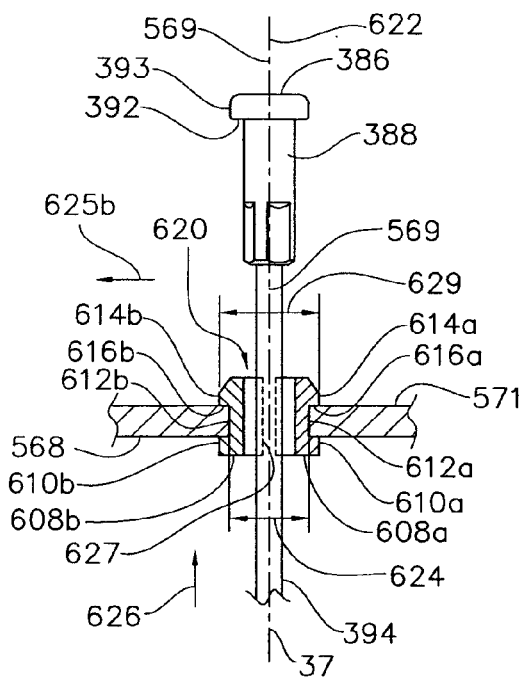
FIG. 6i is a cross section view, taken along 633-633, of the embodiment of FIG. 6a and corresponding to FIG. 6d.

FIGS. 6d and 6i show a completed second assembly step in connecting the spoke 394 to the spoke bed 568. Segment 608b is now shown to be pre-assembled to the hole 573, first in direction 626 until overhang surface 616b is aligned with outboard surface 571, then in direction 625b until collar portion 612b is nested within sidewall 574. Segment 608b now has a laterally expanded orientation that is laterally distal to opposing segment 608a. Flange portion 610b is now abutting inboard surface 572 and overhang surface 616b is overlying, hooking and engaged to outboard surface 571. With segments 608a and 608b opposed and fully seated as shown, the connector 606 is considered to be open, spread or laterally expanded, such that gaps 627 are created between the two. These gaps 627 are necessary to provide the requisite clearance to allow segment 608b to collapse against segment 608a and to permit enlarged portion 614b to clear the hole 573 during the second assembly step. Thus, the connector 606 may achieve an unexpanded or collapsed orientation such that width 629 is reduced to allow the enlarged portions 614a and 614b to pass through the hole 573 as shown. Further, the connector 578 may achieve an open, spread or expanded orientation such that width 629 is expanded to the extent that collar portions 608a and 608b are fully nested and seated against sidewall 574 and overhang surfaces 616a and 616b overlie the outboard surface 571 as shown.

Further, with segments 608a and 608b fully seated as shown, cylindrical reliefs 618a and 618b combine to create a generally circular cylindrical opening 620, with opening axis 622. In contrast to the embodiment of FIGS. 5a-i, where opening 596 includes internal thread portions 592a and 592b, opening 620 is shown to be smooth and cylindrical. Also, it may be seen that the flange portions 610a and 610b combine to create a generally square and noncircular profile that includes flats 611 such that it may be manually manipulated with a wrench (not shown). It is shown here that opening axis 622 is generally parallel and coaxial with central axis 568. Alternatively, opening axis 622 may be offset and parallel or at an angle relative to central axis 568.

Flange portions 610a and 610b preferably include geometry that is sized to extend laterally outwardly beyond the perimeter of hole 573 and to overlie the inboard surface 572 adjacent the hole 573. Thus, by contacting the inboard surface 572, the flange portions 610a and 610b may serve to provide a depth stop to their respective segments 608a and 608b, limiting their advancement in direction 626 during assembly to insure proper alignment between overhang surfaces 616a and 616b and outboard surface 571. Further, the overlie of the flange portions 610a and 610b may serve to retain the segments 608a and 608b to the hole 573, thus preventing them from inadvertently advancing too far beyond the outboard surface 571 and potentially becoming lost and disengaged with the spoke bed 568. While flange portions 610a and 610b provide the convenience of a depth stop and provide the convenience for manual manipulation as described, it is understood that these functions may not be critical for proper function of the corresponding segments 608a and 608b and that flange portions 610a and 610b may be omitted and/or may have an alternate geometry form.

Figure 6J:
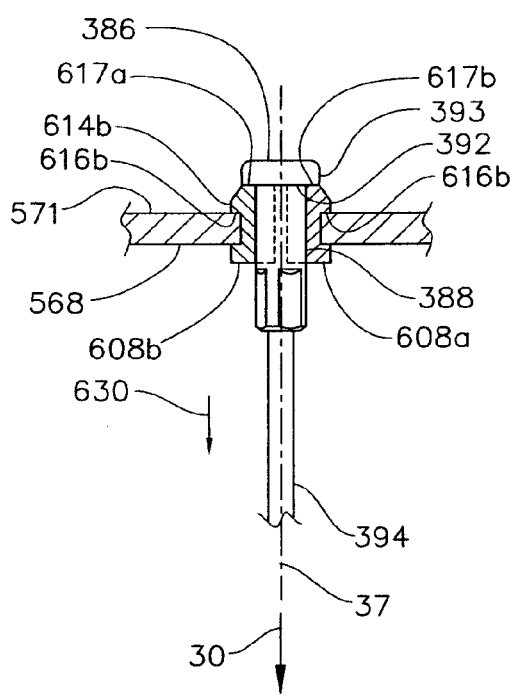
FIG. 6j is a cross section view, taken along 633-633, of the embodiment of FIG. 6a and corresponding to FIG. 6e.

Next, as shown in FIGS. 6e and 6j, spoke 394 and nipple 386 are together drawn in direction 630 along the opening axis 622 such that shank portion 388 extends through opening 620 and transition surface 392 contacts and abuts end faces 617a and 617b. The diameter of shank portion 388 is a close fit with opening 620 while the connector 606 is in its expanded, spread, or open orientation, with shank portion 388 extending through and contacting both cylindrical reliefs 618a and 618b, thus providing a bracing and blocking engagement between the segments 608a and 608b to limit the laterally proximal or inward movement of the segments 608a and 608b and preventing the connector 366 from inadvertently achieving an unexpanded or collapsed orientation. The segments 608a and 608b are now locked in their expanded or open and spread orientation. Thus, the overlie engagement between the overhang surfaces 616a and 616b and outboard surface 571 is now maintained, thereby locking the connector 606 to the spoke bed 568.

Further, the laterally projecting transition surface 392 now has an overlie blocking engagement with end faces 617a and 617b. The nipple 386 is thus engaged to the connector 606 to resist spoke tension 30 forces along tensile axis 36 and to retain the spoke 394 to the spoke bed 568. Thus the spoke 394 is connected and engaged with the nipple 386, which is connected and engaged to the connector 606, which is connected and engaged to the spoke bed 568. It should be noted that the nipple 386 serves as an intermediate connecting element between the spoke 394 and the connector 606. These connections effectively join the spoke 394 to the spoke bed 356 to resist spoke tension 30. Thus, a blind connection between the spoke 394 and the spoke bed 356 is achieved. It may be seen that the present invention, when use to provide a blind spoke connection to the rim, provides particular advantage in tubeless tire configurations, since the sealed tire bed (not shown) is not required to be pierced and may now be used as a sealing air barrier. Spoke tension may be adjusted in the conventional manner, with nipple 386 rotated independently of the spoke 394 about the longitudinal axis 37 to threadably adjust the engagement between internal threads 391 and external threads 395. Further, nipple 386 may be rotated independently of the connector 606 about the opening axis 622. Alternatively, the nipple 386 may be rotatably fixed relative to the connector 606 and/or the spoke 394.

It is noted that end faces 617a and 617b constitute the longitudinally outward terminus of the connector 606 and that the overlie engagement between transition surface 392 and end faces 617a and 617b is located to be longitudinally outward from the outboard surface 571. This is preferable, since it allows the diameter 575 of hole 573 to be sized for close clearance fit with the diameter 398 of head portion 393. This permits the diameter 575 of the hole 573 to be minimized to insure the minimum amount of material removal (due to hole 573) and the maximum strength of the spoke bed 568. Alternatively, the overlie engagement between transition surface 392 and end faces 617a and 617b may be located longitudinally inward from the outboard surface 571. However, this requires that the segments 608a and 608b must also include extension geometry that surrounds the head portion 393 and extends longitudinally outwardly through the hole 573 such that overhang surfaces 616a and 616b may engage the outboard surface 571. Thus, the diameter 575 of hole 573 must now be substantially larger than the diameter 398 of the head portion 393, since it must also accommodate this additional extension geometry of the segments. The larger hole 573 is less preferable, since it corresponds to more material removal and greater weakness of the spoke bed 568. The spoke bed 568 may require greater thickness and weight as a result.

Since the shank portion 388 extends through the opening 620, flats 611 are now accessible on the exposed longitudinally inward side of spoke bed 568, the nipple 386 may be threadably adjusted relative to the spoke 394 and the spoke tension 30 pre-load may be adjusted as previously described by means of a wrench (not shown) engaged to flats 389. Further, the connector 606 may be prevented from inadvertently rotating during this adjustment by means of a wrench (not shown) engaged with flats 611.

The embodiment of FIGS. 7a-c is similar to the embodiment of FIGS. 6a-j. However, while FIGS. 6a-j shows a nipple 386 with a circular cylindrical shank portion 388, FIGS. 6a-d shows a nipple 670 with a non-circular shank portion 672 that includes longitudinal ribs 674a and 674b. Spoke bed 568 is identical to that shown and described in FIGS. 5a-i and is shown in fragmentary view for illustration purposes. It is understood that spoke bed 568 constitutes a portion of the rim or hub flange to which the connector 606 is attached. The connector 606 is identical to that shown and described in FIGS. 6a-j and includes segments 608a and 608b.

Nipple 670 includes a shank portion 672 with longitudinal ribs 674a and 674b, an enlarged head portion 682 and a transition surface 680 therebetween. Transition surface 680 is shown here to be generally planar and perpendicular to the longitudinal axis 37. Nipple 670 also includes a countersink 679 and longitudinal hole 678 therethrough to accept the spoke 100. Spoke 100 is identical to that described in FIG. 5a-i. The spoke 100 is shown in FIG. 7a to be loosely preassembled to the nipple 670, with the shank portion 101 extending through the hole 678 along the longitudinal axis 37.

As shown in FIG. 7a, nipple 670 and spoke 100 are first inserted through hole 573 in direction 681, with nipple 670 longitudinally outward of outboard surface 571 and with spoke 100 extending through the hole 573. Segments 608a and 608b are positioned to be assembled to spoke bed 568 as previously described in FIGS. 6a-j.

As shown in FIGS. 7b and 7c, the segments 608a and 608b are shown to be assembled to the spoke bed 568 in general direction 681 in a manner identical to that described in FIGS. 6a-j. The overhang surfaces 616a and 616b now overlie the outboard surface 571 and retain the connector 606 within the hole 573. Gaps 627 are shown between segments 608a and 608b, as also described in FIGS. 6a-j. Spoke 100 and nipple 670 are also shown to both be drawn in direction 677 along the opening axis 622 such that shank portion 672 extends through opening 620 and the laterally projecting transition surface 680 contacts end faces 617a and 617b. It is noted that ribs 674a and 674b are also aligned to be longitudinally overlapping and nested within their corresponding gaps 627.

The diameter of shank portion 672 is a close fit with opening 620 while the connector 606 is in its expanded or open orientation, with shank portion 672 bracing across both cylindrical reliefs 618a and 618b, thus providing a bracing and blocking engagement between the segments 608a and 608b to limit the laterally proximal or inward movement of the segments 608a and 608b and preventing the connector 606 from inadvertently achieving an unexpanded or collapsed orientation. The segments 608a and 608b are now locked in their expanded or open and spread orientation. Thus, the overlie engagement between the overhang surfaces 616a and 616b and outboard surface 571 is now maintained, thereby locking the connector 606 to the spoke bed 568.

Further, the ribs 674a and 674b are nested and longitudinally overlapping gaps 627. Additionally or alternatively to the bracing function of the shank portion 672 described above, ribs 674a and 674b may serve to brace across gaps 627, thus providing a bracing and blocking engagement between the segments 608a and 608b to limit the laterally proximal or inward movement of the segments 608a and 608b and preventing the connector 606 from inadvertently achieving an unexpanded or collapsed orientation. In addition, the engagement between ribs 674a and 674b and gaps 627 serve to rotationally key and lock the nipple 670 and connector 606 to each other about the opening axis 622. The segments 608a and 608b are now locked in their expanded or open and spread orientation. Thus, the overlie engagement between the overhang surfaces 616a and 616b and outboard surface 571 is now maintained, thereby locking the connector 606 to the spoke bed 568. Finally, as spoke tension 30 is applied to the spoke 100 along tensile axis 36, the spoke 100 is further drawn in direction 677 and the laterally projecting transition surface 104 is nested within the countersink 679 in an overlie engagement.

Further, transition surface 680 now has an overlie blocking engagement with end faces 617a and 617b and the nipple 670 is now engaged to the connector 606 to resist spoke tension 30 forces and to retain the spoke 100 to the spoke bed 568. Transition surface 104 is now nested within countersink 679 to create an overlie engagement between spoke 100 and nipple 670. Thus the spoke 100 is connected and engaged with the nipple 670, which is connected and engaged to the connector 606, which is connected and engaged to the spoke bed 568. It should be noted that the nipple 670 serves as an intermediate connecting element between the spoke 100 and the connector 606. These connections effectively join the spoke 100 to the spoke bed 568 to resist spoke tension 30 along tensile axis 36. Thus, a blind connection between the spoke 100 and the spoke bed 568 is achieved.

The embodiment of FIGS. 8a-c is similar to the embodiment of FIGS. 6a-j. However, while FIGS. 6a-j shows a nipple 386 as an intermediate connecting element and shows a connector 606 with a straight opening 620, FIGS. 8a-c eliminates the nipple 386 in favor of a cylindrical head portion 534 that is integral with the spoke 530 and utilizes a connector 685 with a stepped opening 692. Spoke bed 568 is identical to that shown and described in FIGS. 5a-i and is shown in fragmentary view for illustration purposes. It is understood that spoke bed 568 constitutes a portion of the rim or hub flange to which the connector 685 is attached. The spoke 530 includes shank portion 532 and an enlarged head portion 534 of diameter 535, with a transition surface 536 on the underside of the head portion 534 and extending to the shank portion 532. Transition surface 536 is shown here to be generally planar and perpendicular to the longitudinal axis 37.

Connector 685 is shown in greater detail in FIG. 8b and is composed of two segments 686a and 686b, each including associated flange portions 690a and 690b, collar portions 687a and 687b, enlarged portions 688a and 688b, end faces 683a and 683b, and overhang surfaces 689a and 689b respectively. The opening 692 is created by cylindrical reliefs 691a and 691b and extends along the opening axis 693 as shown. In contrast to opening 620 of FIGS. 6a-g, the opening 692 is stepped to include respective enlarged counterbore portions 695a and 695b, smaller necked openings 697a and 697b, and lateral step face portions 696a and 696b extending therebetween respectively. Step face portions 696a and 696b are shown here to be generally planar and perpendicular to the longitudinal axis 37 upon final assembly. With segments 686a and 686b opposed and fully seated as shown in FIG. 8c, gaps 694 are created between the two, as previously described in FIGS. 5a-i and FIGS. 6a-j. The collar portions 687a and 687b are laterally offset from their respective counterbore by offset distances 703a and 703b.

The spoke 530 is shown in FIG. 8a to first be preassembled to the spoke bed 568 in direction 698 with head portion 534 extending longitudinally outward of outboard surface 571 and with shank portion 532 extending through hole 573. The segments 686a and 686b are positioned longitudinally inward of inboard surface 572, with the shank portion 532 also extending between segments 686a and 686b. Next, the connector 685 is assembled to the spoke bed 568, in a manner as described in FIGS. 6a-j, such that overhang surfaces 689a and 689b engage outboard surface 571 as shown in FIG. 9c.

Next, as also shown in FIG. 8c, spoke 530 is drawn in direction 699 along the opening axis 693 such that shank portion 532 extends through necked openings 697a and 697b, head portion 534 is nested in counterbore portions 695a and 695b and laterally projecting transition surface 536 abuts and overlies step faces 696a and 696b. The diameter of head portion 534 is a close fit with counterbore portions 695a and 695b, thus providing a bracing and blocking engagement between the counterbore portions 695a and 695b to limit the laterally proximal or inward movement of the segments 686a and 686b and prevent the connector 685 from inadvertently achieving an unexpanded or collapsed orientation. The segments 686a and 686b are now locked in their expanded or open and spread orientation. Thus, the overlie engagement between the overhang surfaces 689a and 689b and outboard surface 571 is now maintained, thereby locking the connector 685 to the spoke bed 568.

Finally, as spoke tension 30 is applied to the spoke 484, the spoke 484 is pulled in direction 699 and the transition surface 489 bears against step faces 696a and 696b in an overlie engagement. The spoke 530 is now directly engaged to the connector 685 to resist spoke tension 30 forces along tensile axis 36 and to retain the spoke 530 to the spoke bed 568. Thus, a blind connection between the spoke 530 and the spoke bed 568 is achieved. It is noted that the spoke 530 is shown in this embodiment to be directly connected and engaged to the connector 685. This is in contrast to the embodiments of FIGS. 5a-i, FIGS. 6a-j, and FIGS. 7a-c where an intermediate connecting element is utilized (i.e. sleeve 86, nipple 386, nipple 670) for linked connection where the spoke is connected to the intermediate connecting element and the intermediate connecting element is connected to the connector.

It is noted that the overlie engagement between transition surface 536 and step faces 696a and 696b is located to be longitudinally inward from the outboard surface 571. It is also noted that this requires that collar portions 687a and 687b surround the head portion 534 and extend through the hole 573 in order for overhang surfaces 689a and 689b to engage the outboard surface 571. Thus, the diameter 575 of hole 573 must be substantially larger than the diameter 535 of the head portion 534, since it must also accommodate the additional offset distances 703a and 703b in addition to the diameter 535 of head portion 534. This is in contrast to the embodiment of FIGS. 6a-j, where the overlie engagement between transition surface 392 and end faces 617a and 617b is located to be longitudinally outward from the outboard surface 571. In FIGS. 6a-g, the hole 573 does not need to be sized to accommodate this additional lateral offset geometry. Thus, in the embodiments of FIGS. 6a-j, the diameter 575 of hole 573 may be comparatively reduced relative to the diameter 398 of head portion 393, requiring only a clearance fit between diameters 398 and 575. In contrast to FIGS. 6a-j, the larger diameter 575 of hole 573 and/or smaller diameter 535 of head portion 534 of FIG. 8a-c results in a reduced projected area of overlie engagement between transition surface 536 and step faces 696a and 696b (corresponding to higher stress at the overlie engagement) and/or a larger diameter 575 of hole 573 (corresponding to a weaker spoke bed 568).

While shank portion 532 and head portion 534 are shown to be generally circular and concentric about the longitudinal axis 37, shank portion 532 and/or head portion 534 may alternatively be noncircular and/or eccentric about the longitudinal axis 37. In such a case, the reliefs 691a and/or 691b and/or the necked openings 697a and/or 697b may include corresponding noncircular geometry to provide a rotationally keyed engagement between the spoke 530 and the connector 685.

Figure 9A:
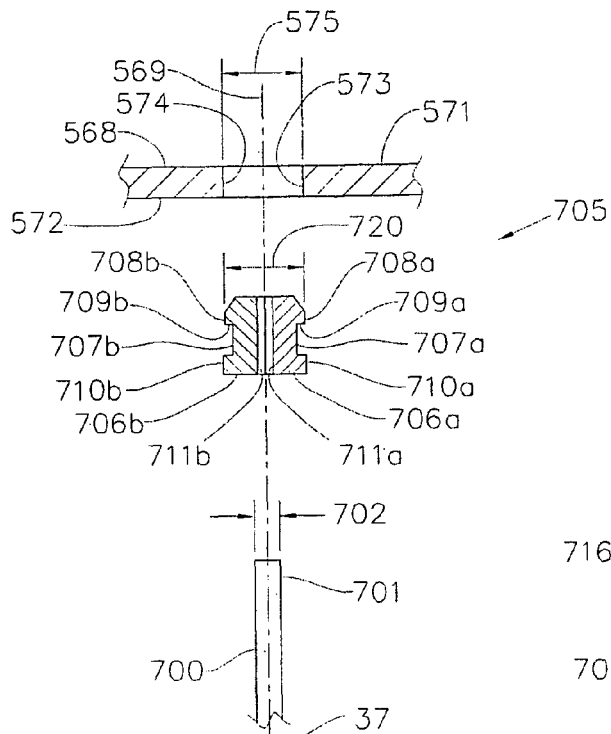
FIG. 9a is a partial exploded cross-sectional view of a fifth embodiment of the present invention, with spoke bed in fragmentary view, describing a blind connection between the spoke and spoke bed, including an integral joinder between the spoke and connector.
Figure 9B:
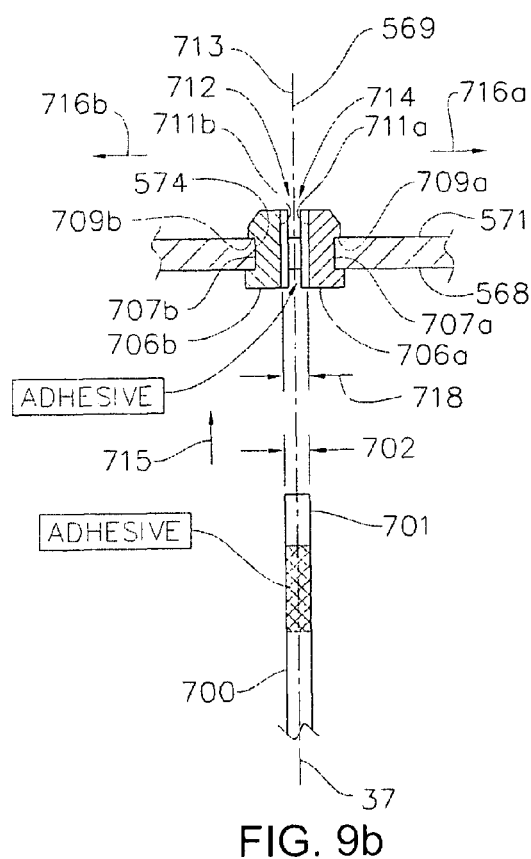
FIG. 9b is a partial cross-sectional view of the embodiment of FIG. 9a, describing an intermediate assembly step between the connector and the spoke bed, with a first segment and a second segment of the connector located within a hole of the spoke bed and engaged thereto.
Figure 9C:
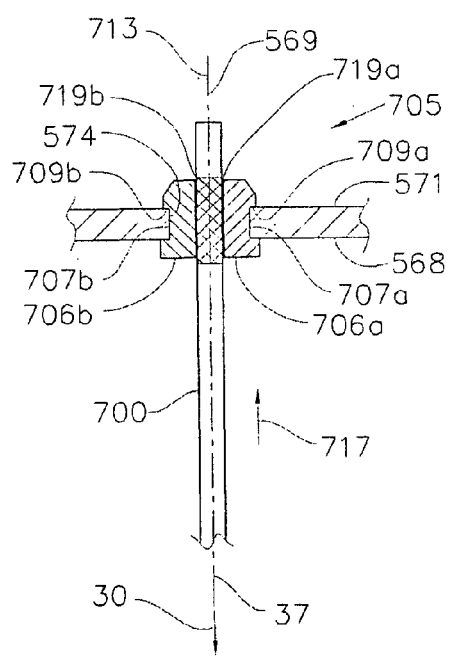
FIG. 9c is a partial cross-sectional view of the embodiment of FIG. 9a, describing a final assembly step between the connector and the spoke bed, with a spoke adhesively joined to the opening of the connector.

The embodiment of FIGS. 9a-c is exemplary to describe how the spoke may be secured to the connector by means of an integral joinder. For general definition purposes herein, an "integral" joinder is one that is integrated and may not be easily disassembled at the service temperature without damaging at least one of the components that are joined or is difficult to disassemble or is otherwise not meant to be disassembled. This integral joinder involves a joining interface directly between two components. This joining interface is often a welded or adhered interface or some other interface where the two joining surfaces are solidly joined to each other to create a unified structure. Preferably this joining interface is a surface interface, rather than a point interface. The integral joinder is in contrast to a fastened joinder, where such a fastened joinder relies solely on a mechanically interlocked engagement to secure or connect the two components to each other. The term "integral" refers to two portions that are unitary, monolithic and/or integrally joined. Further, when two portions are considered "integral" with each other, they may be integrally joined or may be monolithic or otherwise combined as a singular element.

Spoke 700 includes end portion 701 of diameter 702. Spoke bed 568 is identical to that shown in FIGS. 5a-i and is shown in fragmentary view for illustration purposes and it is understood that spoke bed 568 constitutes a portion of the rim or hub flange to which the connector 606 is attached.

Connector 705 is composed of two segments 706a and 706b, each including associated flange portions 710a and 710b, collar portions 707a and 707b, enlarged portions 708a and 708b, and overhang surfaces 709a and 709b respectively. The opening 712 is created by cylindrical reliefs 711a and 711b and extends along the opening axis 713 as shown. FIG. 9a shows segments 706a and 706b as collapsed and proximal to each other, with segment 706a contacting segment 706b as shown. In this collapsed orientation, the width 720 across enlarged portions 708a and 708b is sized to provide a close clearance fit with circular diameter 575 of hole 573, allowing the connector 705 to be assembled within hole 573. Segments 706a and 706b are then simultaneously inserted within hole 573 and advanced in direction 715 until overhang surfaces 709a and 709b clear past outboard surface 571. Segments 706a and 706b are then opposedly spread in directions 716a and 716b respectively to achieve an expanded and distal orientation such that collar portions 707a and 707b are fully seated and nested against hole sidewall 574 as shown in FIG. 9b. Gaps 714 are thus created between segments 706a and 706b and overhang surfaces 709a and 709b are now overlapping outboard surface 571 to create an overlie engagement between the segments 709a and 709b and the spoke bed 568. This embodiment is an example of "simultaneous" installation of segments 708a and 708b within spoke bed 568. This is in contrast to the "sequential" installation of the segments described in some of the other embodiments herein, including the embodiment of FIG. 5a-i. Alternatively, segments 708a and 708b may be installed in hole 573 in a sequential manner similar to that described in FIGS. 6a-j.

Reliefs 711a and 711b are shown in FIG. 9b to be correspondingly spread to be distal from each other such that their combined geometry creates a generally cylindrical opening 712 of diameter 718 that is sized to receive the end portion 701 of spoke 700. Next, uncured adhesive is applied to the surface of reliefs 711a and 711b and to the surface of end portion 701 in preparation for assembly insertion of the spoke 700 into opening 712.

Next, as shown in FIG. 9c, spoke 700 is inserted in opening 712 in direction 717 along the opening axis 713 such that end portion 701 extends through and within opening 712 as shown. The previously applied adhesive is now distributed on the surfaces of the end portion 701 and on reliefs 711a and 711b, thus creating adhesive interfaces 719a and 719b at the interfaces where these surfaces meet. Upon curing or hardening of the adhesive, the spoke 700 is securely joined to the connector 705 at the adhesive interfaces 719a and 719b, resulting in an integral joinder therebetween.

The diameter 702 of end portion 701 is a close fit with the diameter 718 of opening 712, thus providing a bracing and blocking engagement between the reliefs 711a and 711b to limit the laterally proximal or inward movement of the segments 706a and 706b and prevent the connector 705 from inadvertently achieving an unexpanded or collapsed orientation. The segments 706a and 706b are now locked in their expanded or open and spread orientation. Thus, the overlie engagement between the overhang surfaces 709a and 709b and outboard surface 571 is now maintained, thereby locking the connector 705 to the spoke bed 568. Further, it is anticipated that the adhesive may be applied in paste form and may serve to fill any clearance between diameters 702 and 718. Additionally some adhesive may migrate into gaps 714, thus providing a further bracing and blocking engagement between the segments 706a and 706b upon curing and solidification of the adhesive. The spoke 700 is now directly engaged to the connector 705 to resist spoke tension 30 forces along tensile axis 36 and to retain the spoke 700 to the spoke bed 568. Thus, a blind connection between the spoke 700 and the spoke bed 568 is achieved. Further, the adhesive interfaces 719a and 719b extend longitudinally along the full length of the connector 705, including the portion that is longitudinally outward of the outboard surface 571. This serves to provide longitudinal reinforcement the connector 705. This integral joinder also extends longitudinally outward of the outboard surface 571 as is preferable to join the spoke 700 adjacent the enlarged portions 708a and 708b to optimize stress distribution in the connector 705 associated with spoke tension 30 loads.

The embodiment of FIGS. 9a-c show a circular cylindrical interface between the end portion 701 and opening 712. Alternatively, the interface may be a non-circular cylindrical interface. For example, the spoke may be flattened into an elliptical cross sectional profile in the region where it interfaces the opening 712. The adhesive described in this embodiment may preferably be a paste adhesive, such as epoxy. However, a wide range of alternate adhesives, as known in industry, may be substituted. Further, it is noted that the spoke 700 is shown in this embodiment to be directly connected and engaged to the connector 705. It is noted that such an integral joinder may alternatively be achieved between the connector and an intermediate connecting element in an indirect connection where the spoke is connected to the intermediate connecting element and the intermediate connecting element is connected to the connector.

Figure 10A:
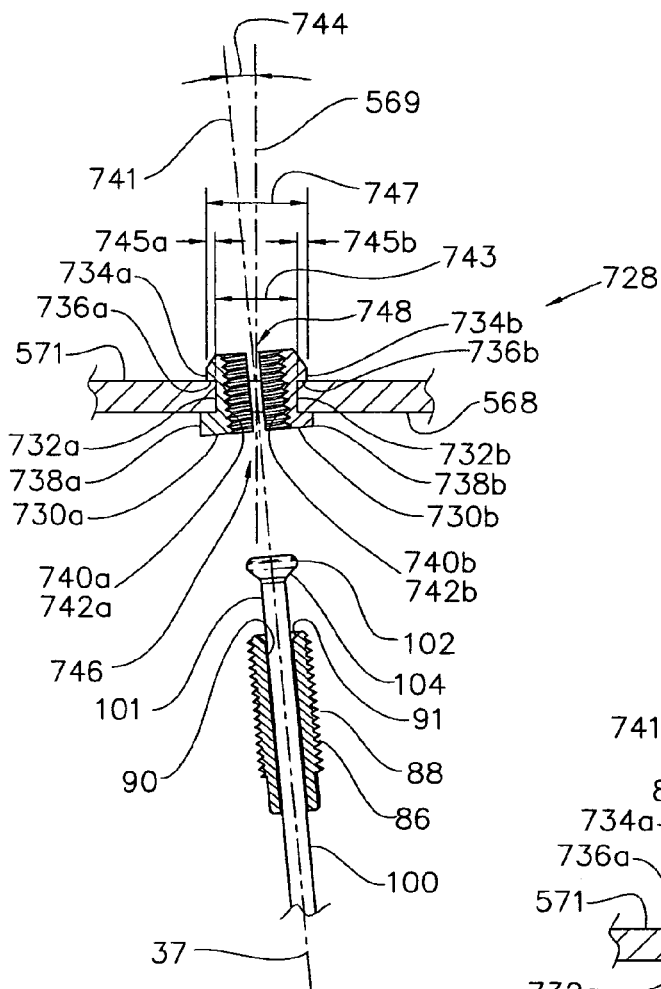
FIG. 10a is a partial exploded cross-sectional view of a sixth embodiment of the present invention, with spoke bed in fragmentary view, describing a blind connection between the spoke and spoke bed, including a nonparallel angle between the opening axis of the connector and the central axis of the hole, and showing the connector as installed within the hole of the spoke bed.
Figure 10B:
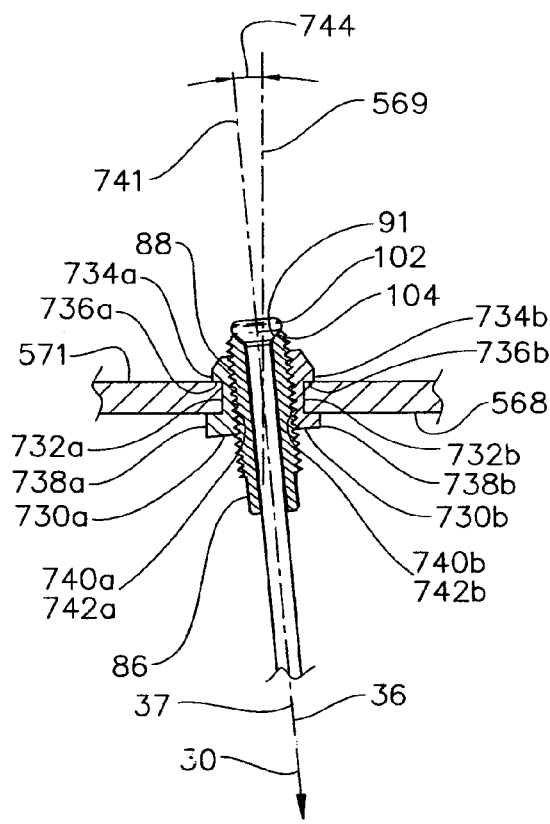
FIG. 10b is a partial cross-sectional view of the embodiment of FIG. 10a, describing a final assembly step between the connector and the spoke, with a sleeve threadably engaged to the opening of the connector, including a spoke connected to the sleeve.

The embodiment of FIGS. 10a-b is identical to the embodiment of FIGS. 5a-i in most respects. However, FIGS. 10a-b describe an exemplary embodiment where the opening axis 741 of the connector 728 is at a non-parallel angle 744 relative to the central axis 569. Spoke 100, sleeve 86, and spoke bed 568 are identical to that described in FIGS. 5a-i.

Connector 728 is a multi-piece connector consisting of segments 730a and 730b, each include associated flange portions 738a and 738b, collar portions 732a and 732b, enlarged portions 734a and 734b and overhang surfaces 736a and 736b respectively. Segments 730a and 730b also include semi-circular cylindrical reliefs 740a and 740b, with respective internal thread portions 742a and 742b that extend along opening axis 741. As particularly shown in FIG. 5a, collar portions 732a and 732b have a width 743 across their external surfaces and enlarged portions 734a and 734b have a width 747 across their outer surfaces, with overhang surfaces 736a and 736b having widths 745a and 745b respectively. Cylindrical reliefs 740a and 740b combine to create opening 746 that extends longitudinally along the opening axis 741 through their flange portions 738a and 738b, collar portions 732a and 732b, and enlarged portions 734a and 734b, respectively.

FIG. 10a corresponds to the assembly sequence of FIG. 5h. The connector 728 is assembled to the spoke bed 568 in a manner similar to that described in FIGS. 5a-i. FIG. 10b corresponds to the assembly sequence of FIG. 5i, with external threads 88 threadably engaged to internal threaded portions 742a and 742b in a manner similar to that described in FIGS. 5a-i. Longitudinal axis 37 is shown to be at angle 744 with respect to central axis 569 and is also non-orthogonal to inboard surface 568 and outboard surface 571.

FIGS. 10a-b describe an embodiment where the opening axis 741 is at a non-parallel angle 744 to the central axis 569 of the spoke bed 568. This angle 744 may be advantageous because it allows the hole 573 to be drilled at an angle that may not necessarily be aligned with the span of spoke 100 or with the tensile axis 36. For example, if the spoke bed is a portion of the rim (not shown), the hole 573 may be drilled at straight radial direction, as is most common and as shown in FIGS. 5a-l, for example. Then, the angle 744 may be oriented such that the tensile axis 36 of the sleeve 86 and corresponding spoke 100 may be aligned to accommodate the bracing angle of the spoke span. In most bicycle wheel applications, it is preferable that this angle 744 is between 3 and 12 degrees. It is shown that angle 744 extends in a plane that is generally perpendicular to the plane of slot 748. Alternatively, it is envisioned that angle 744 may extend in a plane that is generally parallel to the plane of slot 748. Further, it is shown that slot 748 extends in a direction generally parallel to the opening axis 741. Alternatively, the slot 749 may extend in any other direction.

Figures 11A, 11B:
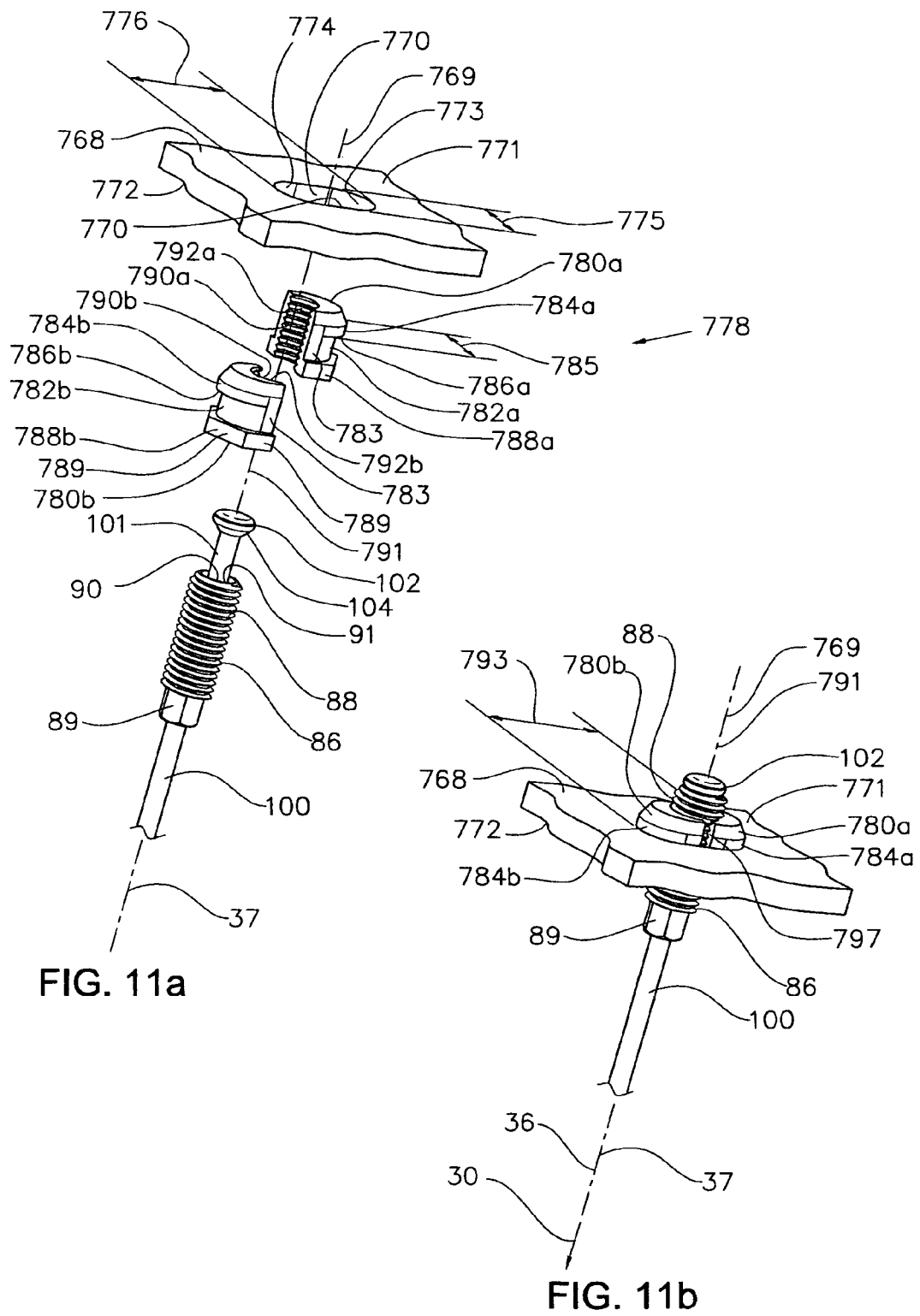
FIG. 11a is a partial exploded perspective view of a seventh embodiment of the present invention, with spoke bed in fragmentary view, describing a blind connection between the spoke and spoke bed, including an connector that is rotationally keyed to a noncircular hole of the spoke bed.
FIG. 11b is a partial exploded perspective view of the embodiment of FIG. 11a, describing a final assembly step, with a sleeve threadably assembled to the first and second connector segments, including a spoke connected to the sleeve.

The embodiment of FIGS. 11a-b is identical to the embodiment of FIGS. 5a-i in most respects. However, FIGS. 11a-b describe an exemplary embodiment where the hole 773 of spoke bed 768 is non-circular, with a length 776 greater than its width 775. FIG. 11a corresponds to the assembly sequence of FIG. 5a. The connector 778 is assembled to the spoke bed 768 in a manner similar to that described in FIGS. 5a-i. FIG. 11b corresponds to the assembly sequence of FIG. 5e, with external threads 88 threadably engaged to internal threaded portions 792a and 792b in a manner similar to that described in FIGS. 5a-i. Spoke 100 and sleeve 86 are identical to that described in FIGS. 5a-i.

Spoke bed 768 includes a radially outboard surface 771, a radially inboard surface 772. Spoke bed 768 also includes a non-circular hole 773 therethrough with hole sidewall 774 and with a length 776 greater than its width 775. In this figure, the noncircular hole 573 has an oval profile with flats 770 along the width 775. While this oval hole profile is merely representative of a wide range of possible noncircular hole profiles, the oval profile may be particularly preferable since it may be produced in a simple milling operation. Hole 773 extends along central axis 769, which is shown here to be generally perpendicular to the outboard surface. Spoke bed 768 is shown in fragmentary view for illustration purposes and it is understood that spoke bed 768 constitutes a portion of the rim or hub flange to which the connector 778 is attached.

Connector 778 is a multi-piece connector consisting of segments 780a and 780b, each include associated flange portions 788a and 788b with flats 789, collar portions 782a and 782b, enlarged portions 734a and 734b and overhang surfaces 786a and 786b respectively. Segments 780a and 780b also include semi-circular cylindrical reliefs 790a and 790b, with respective internal thread portions 792a and 792b that extend along opening axis 791. Cylindrical reliefs 790a and 790b extend longitudinally along the opening axis 791 through their flange portions 788a and 788b, collar portions 782a and 782b, and enlarged portions 784a and 784b, respectively. As shown in FIG. 11b, upon installation and expansion of segments 780a and 780b within hole 773, gaps 797 are created between segments 782a and 782b. Also, the length 793 across enlarged portions 784a and 784b is now larger than the corresponding length 776 of hole 773 to create an overlie engagement between overhang surfaces 786a and 786b and outboard surface 771 to support spoke tension 30 along tensile axis 36.

It is noted that collar portions 782a and 782b are not semi-circular in profile, but instead include flats 783 and are semi-oval shaped to match with the oval hole 773. It may be seen that width 785 across flats 783 corresponds to width 775 across flats 770 such that, upon subsequent installation of segments 780a and 780b as shown in FIG. 11b, flats 783 are engaged with flats 775 in a rotationally keyed engagement about the central axis 769. Thus, connector 778 is correspondingly rotationally keyed to the spoke bed 768. This arrangement may be advantageous since it may be used to control the rotation of the connector 778 relative to the spoke bed 768. Additionally, such a noncircular hole may permit a corresponding additional thickness of the collar portion(s) 782a and/or 782b, thus advantageously imparting additional robustness of the connector 778.

The embodiment of FIGS. 12a-c is identical to the embodiment of FIGS. 5a-i except for the inclusion of an additional spacer 750 element. Spoke 100, spoke bed 568, connector 578 and sleeve 86 are all identical to those shown in FIGS. 5a-i. Spacer 570 includes a circular base portion 752 with central hole 753 therethrough. Extensions 755a and 755b extend from the base portion 752 and include enlarged portions 756a and 756b and overhang surfaces 757a and 757b and inner surfaces 759a and 759b respectively.

FIG. 12a corresponds to the assembly sequence of FIG. 5d and FIG. 12c corresponds to the assembly sequence of FIG. 5e. The connector 578 is installed within the spoke bed 568 in a manner previously described in FIGS. 5a-i. With segments 580a and 580b installed within the hole 573 as described in FIGS. 5a-i, the spacer 750 is then installed in direction 760 in the connector 578, with extension 755a inserted within gap 597a and 755b inserted within gap 597b. During installation, the extensions 755a and 755b may be flexed laterally proximal or inwardly to permit enlarged portions 756a and 756b to clear through the hole 573. When the spacer 750 is advanced in direction 760 until overhang surfaces 757a and 757b are aligned with outboard surface 571, the extensions 755a and 755b may now spring back apart, with overhang surfaces 757a and 757 overlapping the outboard surface 571 in an overlie engagement as shown in FIG. 12c. With extensions 755a and 755b positioned within gaps 597a and 597b, these gaps are now essentially plugged and filled by the extensions 755a and 755b, thus providing a bracing and blocking engagement between the segments 580a and 580b to limit their laterally proximal or inward movement and thus preventing the connector 578 from inadvertently achieving an unexpanded, proximal or collapsed orientation. The segments 580a and 580b are now locked in their expanded, distal or open and spread orientation relative to each other. Thus, the overlie engagement between the overhang surfaces 586a and 586b and the outboard surface 571 is now maintained by the spacer 750, thereby locking and engaging the connector 578 to the spoke bed 568.

Next, the sleeve 86 and spoke 100 are passed through the opening 596 in direction 760 and external threads 88 are threadably mated to internal threads 592a and 592b in a similar manner to that described in FIGS. 5a-i and shown in FIG. 12c. Sleeve 86 serves as bracing and blocking engagement between inner surfaces 759a and 759b of extensions 755a and 755b to further lock them in their expanded orientation relative to each other. Thus, the overlie engagement between the overhang surfaces 586a and 586b and the outboard surface 571 is now further maintained by the sleeve 86, thereby locking and engaging the connector 578 to the spoke bed 568. Inner surfaces 759a and 759b are shown in FIG. 12b to have a serrated surface to be matched with the external threads 88 of sleeve 86. Thus, serrations of inner surfaces 759a and 759b may interlock and engage with external threads 88 to further lock the spacer 750 to the spoke bed 568. The connections and engagements between the spoke 100, the sleeve 86, the spacer 750, the connector 578, and the spoke bed 568 serve to effectively join the spoke 100 to the spoke bed 568 to resist spoke tension 30.

The embodiment of FIGS. 13a-d is virtually identical to the embodiment of FIGS. 5a-i except for the substitution of segment 580c for segment 580b. Spoke bed 568 spoke 100, and sleeve 86 are all identical to those shown in FIGS. 5a-i. Segment 580a is generally identical to that shown in FIGS. 5a-i. Segment 580c is similar to segment 580b, with the exception that segment 508c does not include an enlarged portion or an overhang surface. Segment 580c includes flange portion 588c, collar portion 782c, and semi-circular cylindrical relief 590c with internal thread portion 592c that extends along opening axis 591. Cylindrical relief 790c extends longitudinally along the opening axis 591 through flange portion 588c and collar portion 582c. Connector 602 is a multi-piece connector consisting of segments 580a and 580c.

Figure 13A:
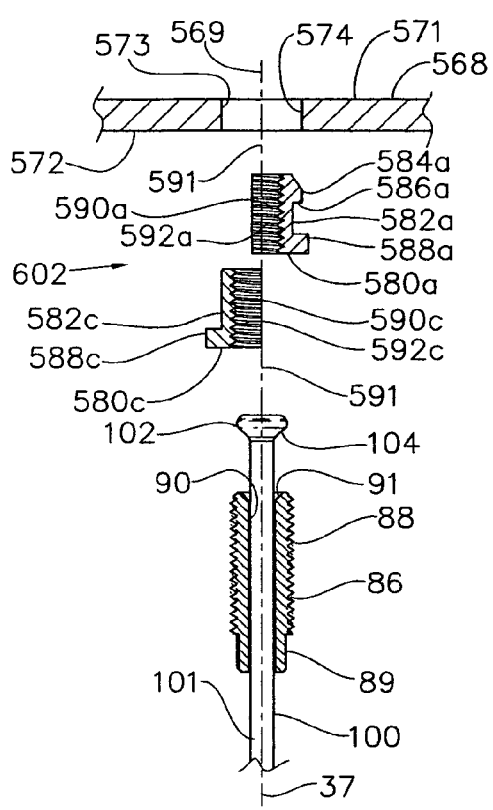
FIG. 13a is a an exploded cross section view of a ninth embodiment of the present invention, with spoke bed in fragmentary view, describing a blind connection between the spoke and spoke bed, including a multi-piece expandable connector and a sleeve, with the overhang surface omitted from one of the segments of the connector, and in an assembly sequence similar to that described in FIG. 5f.
Figure 13B:
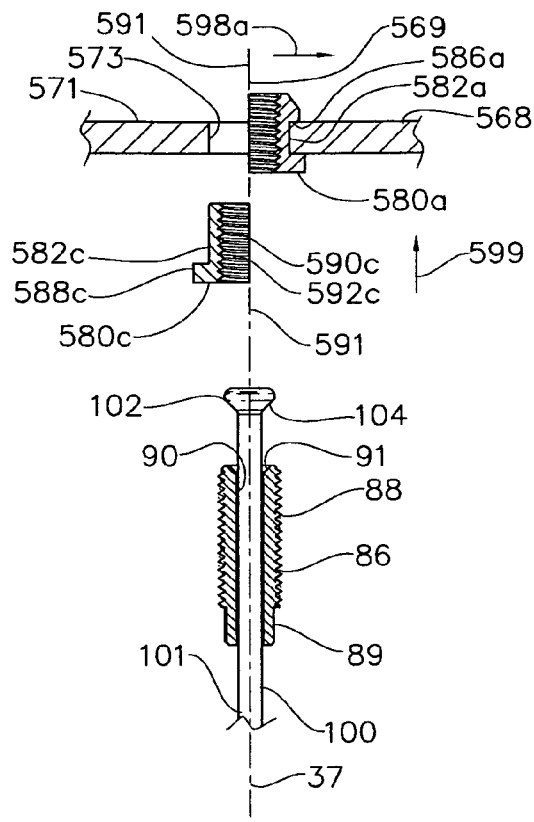
FIG. 13b is an exploded cross section view of the embodiment of FIG. 13a, in an assembly sequence similar to that described in FIG. 5g.
Figure 13C:
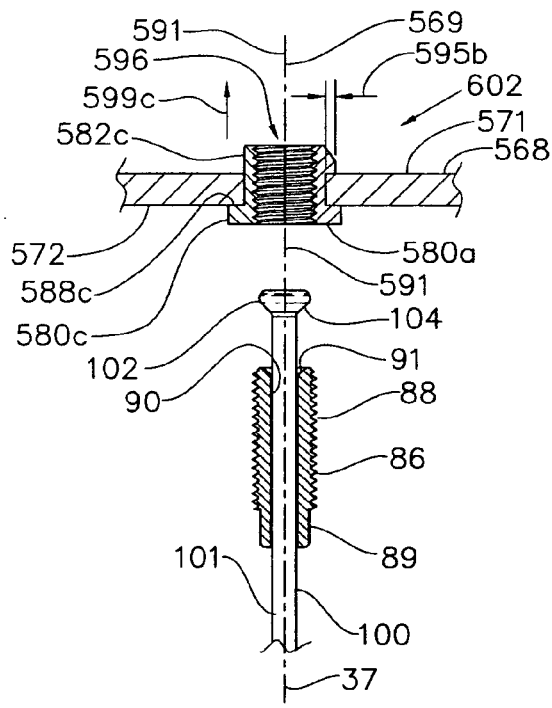
FIG. 13c is an exploded cross section view of the embodiment of FIG. 13a, in an assembly sequence similar to that described in FIG. 5h.
Figure 13D:
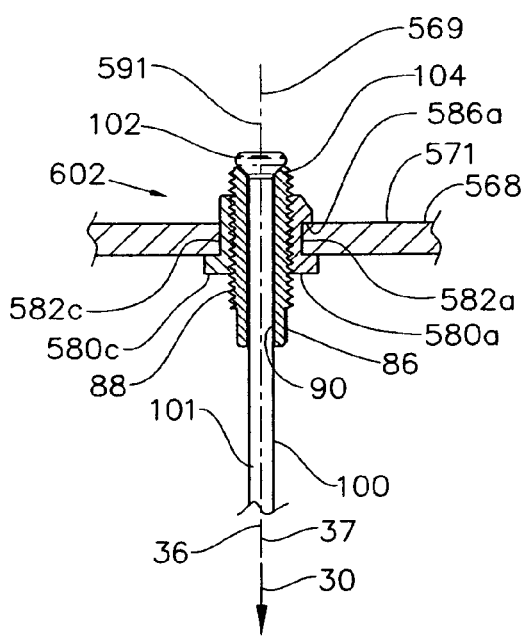
FIG. 13d is a cross section view of the embodiment of FIG. 13a, and in an assembly sequence similar to that described in FIG. 5i.

FIG. 13a corresponds to the assembly sequence of FIG. 5f and FIG. 13b corresponds to the assembly sequence of FIG. 5g and FIG. 13c corresponds to the assembly sequence of FIG. 5h and FIG. 13d corresponds to the assembly sequence of FIG. 5i. Segment 508a is first installed within the hole 573 of spoke bed 568 as previously described in FIGS. 5a-i and as shown in FIG. 13b. It is noted that, as segment 580a is inserted through hole 573, with enlarged portion 584 aligned with hole sidewall 574, segment 580a is in a laterally contracted orientation that is proximal to segment 580c. Then, when segment 580a is shifted in direction 598a, it achieves a laterally expanded orientation that is laterally distal to segment 580c.

Next, segment 580c is advanced in direction 599c through hole 573 until flange portion 588c abuts the inboard surface 572 of the spoke bed 568 as shown in FIG. 13c. Internal thread portion 592c is now aligned with internal thread portion 592a along the opening axis 591 to achieve an internally threaded opening 596 to receive external threads 88 of collar 86. FIGS. 13b-c describe a sequential installation of segments 580a and 580c. It is noted that, since segment 580c has no enlarged portion or laterally extending overhang surface, it does not need to laterally collapse or laterally expand during installation. Therefore, segment 580c may be sized such that it fills the remainder of the perimeter of hole 573 that is left over after the first assembly step of the installation of segment 580a. As such, upon installation of segment 580c in a second step, as shown in FIG. 13c, segment 580c laterally abuts segment 580a, with collar portion 584c nested with hole sidewall 574. Since segment 580c does not need to achieve a collapsed or expanded orientation, there is also no gap between segments 580a and 580c. Further, segment 580c now provides a bracing and blocking engagement between the hole 573 and segment 580a to limit the laterally proximal movement of segment 580a and thus preventing the connector 602 from inadvertently achieving an unexpanded, proximal or collapsed orientation. The segment 580a is now locked in its laterally expanded, distal or open and spread orientation. Thus, the overlie engagement between the overhang surface 586a and the outboard surface 571 is now maintained, thereby locking and engaging the segment 580a to the spoke bed 568.

Next, the sleeve 86 (with spoke 100) is threadably installed through the opening 596, with external threads 88 threadably mated to internal threads 592a and 592c in a similar manner to that described in FIGS. 5a-i and shown in FIG. 13d. Sleeve 86 serves as an additional bracing and blocking engagement between segments 580a and 580b to further lock them in their expanded orientation relative to each other and limit their proximal movement. Thus, the overlie engagement between the overhang surfaces 586a and 586b and the outboard surface 571 is now further maintained by the sleeve 86, thereby locking and engaging the connector 602 to the spoke bed 568. Further, with external threads 88 engaged to both internal thread portions 592a and 592b, segment 580c is longitudinally engaged to segment 580a along the opening axis 591 and is thereby also engaged to the spoke bed 568. The connections and engagements between the spoke 100, the sleeve 86, the connector 602, and the spoke bed 568 serve to effectively join the spoke 100 to the spoke bed 568 to resist spoke tension 30 along tensile axis 36.

Figure 14:
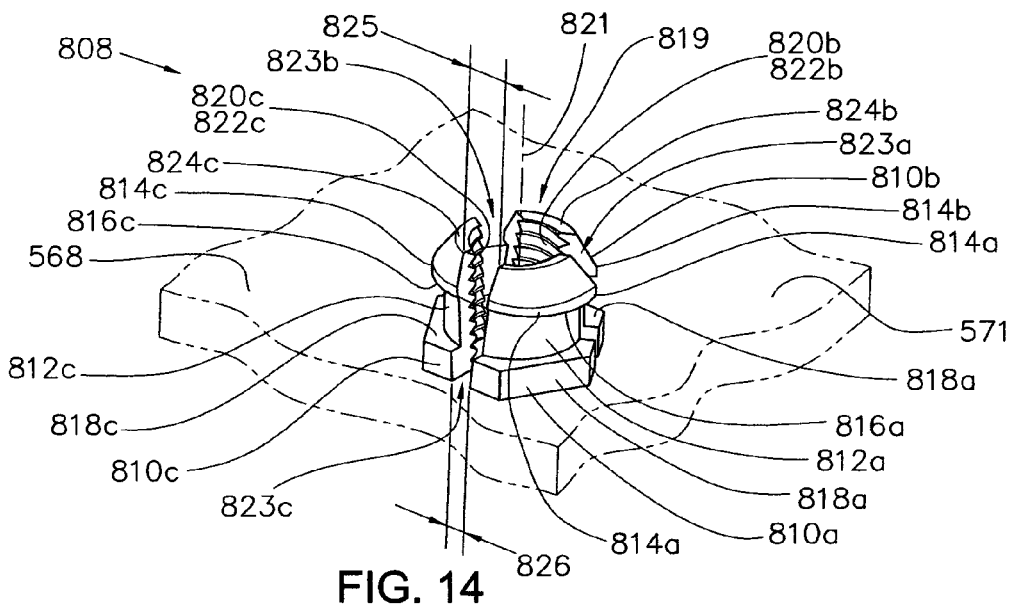
FIG. 14 is a an exploded perspective view of a tenth embodiment of the present invention, with spoke bed in phantom fragmentary view, describing a multi-piece expandable connector composed of three segments.

While the previous embodiments have shown connectors as being composed of two segments, it may be advantageous to have the connector as composed of three or more segments. FIG. 14 describes an embodiment where the connector 808 is composed of three segments 810a, 810b, and 810c and is exemplary of a connector that is composed of more than two segments. Spoke bed 568 is identical to that described in FIGS. 5a-i and is shown in phantom for better clarity. The segments 810a, 810b, and 810c are very similar to segments 580a and 580b of FIGS. 5a-i and FIG. 14 corresponds to the assembly/installation sequence of FIGS. 5d and 5h.

Connector 806 is composed of three segments (810a, 810b, and 810c), each including associated flange portions (818a, 818b, and 818c), collar portions (812a, 812b, and 812c), enlarged portions (814a, 814b, and 814c), end faces (824a, 824b, and 824c) and overhang surfaces (816a, 816b, and 816c) respectively. The opening 819 is created by cylindrical reliefs (820a, 820b, and 820c) with internal threaded portions (822a, 822b, and 822c) and extends along the opening axis 821 as shown.

With the connector 806 as shown in its expanded configuration gaps (823a, 823b, and 823c) are created between segments (810a, 810b, and 810c) and overhang surfaces (816a, 816b, and 816c) are now overlapping outboard surface 571 to create an overlie engagement between the connector 806 and the spoke bed 568. It is noted that gaps (823a, 823b, and 823c) are tapered to have a greater width 825 at their longitudinally outward end adjacent end faces (824a, 824b, and 824c) and a narrower width 826 at their longitudinally inward end adjacent flange portions (818a, 818b, and 818c). These tapered gaps permit the enlarged portions (814a, 814b, and 814c) to be collapsed to a greater degree during their previous installation through hole 573, while minimizing the width 826 of the exposed portion of the gaps (823a, 823b, and 823c) adjacent the flange portions (818a, 818b, and 818c). This greater degree of collapse may permit simultaneous installation of two or more of the segments (810a, 810b, and 810c) as described previously. Otherwise, these segments may be installed sequentially as previously described. Upon installation of segments as shown, a spoke (not shown) or sleeve (not shown) may be threadably connected to the opening 816 in a manner similar to that described in FIGS. 5a-i.

The embodiment of FIGS. 15a-g is similar to that of FIG. 6a-j, however FIGS. 15a-g show segments that are installed simultaneously. Also, instead of the parallel expansion (as in directions 625a and 625b) of segments 608a and 608b, segments 840a and 840b are expanded by an angular splaying as described in FIGS. 15a-f. Further, instead of the shank portion 388 of nipple 386 providing the blocking engagement of segments 608a and 608b, it is the head portion 893 of nipple 886 that provides the blocking engagement to lock segments 840a and 840b in their expanded orientation.

Spoke 394 and spoke bed 568 are identical to those described in FIGS. 6a-j. Spoke nipple 886 includes a shank portion 888, an enlarged head portion 893 with a cylindrical surface 895 of diameter 894, a flange 897 with flange face 898. Laterally projecting transition surface 892 extends between head portion 893 and shank portion 888. Shank portion 888 also includes flats 89 such that it may be manually manipulated with a wrench (not shown). Transition surface 892 is shown here to be a generally planar and laterally projecting surface, extending perpendicular to the longitudinal axis 37. Nipple 886 also includes longitudinal hole 890 therethrough with internal threads 891 to threadably mate with external threads 395 of spoke 394. Nipple 886 also includes flange 897 with longitudinally outward flange face 898. The spoke 394 is shown in FIG. 15a to be threadably preassembled to the nipple 886, with external threads 395 mated to internal threads 891 and with the end portion 396 extending within the hole 890 along the longitudinal axis 37.

Spoke bed 568 is shown in fragmentary view for illustration purposes and it is understood that spoke bed 568 constitutes a portion of the rim or hub flange to which the connector 838 is attached. Connector 838 is a multi-piece connector consisting of segments 840a and 840b, each include associated flange portions 848a and 848b with flats 856, collar portions 842a and 842b, enlarged portions 844a and 844b, end faces 847a and 847b, and overhang surfaces 846a and 846b respectively. The opening 852 is created by counterbore portions 855a and 855b and smaller necked openings 858a and 858b, with lateral step faces 854a and 854b extending therebetween respectively. Segments 840a and 840b also include gap faces 859a and 859b respectively.

Figure 15A:
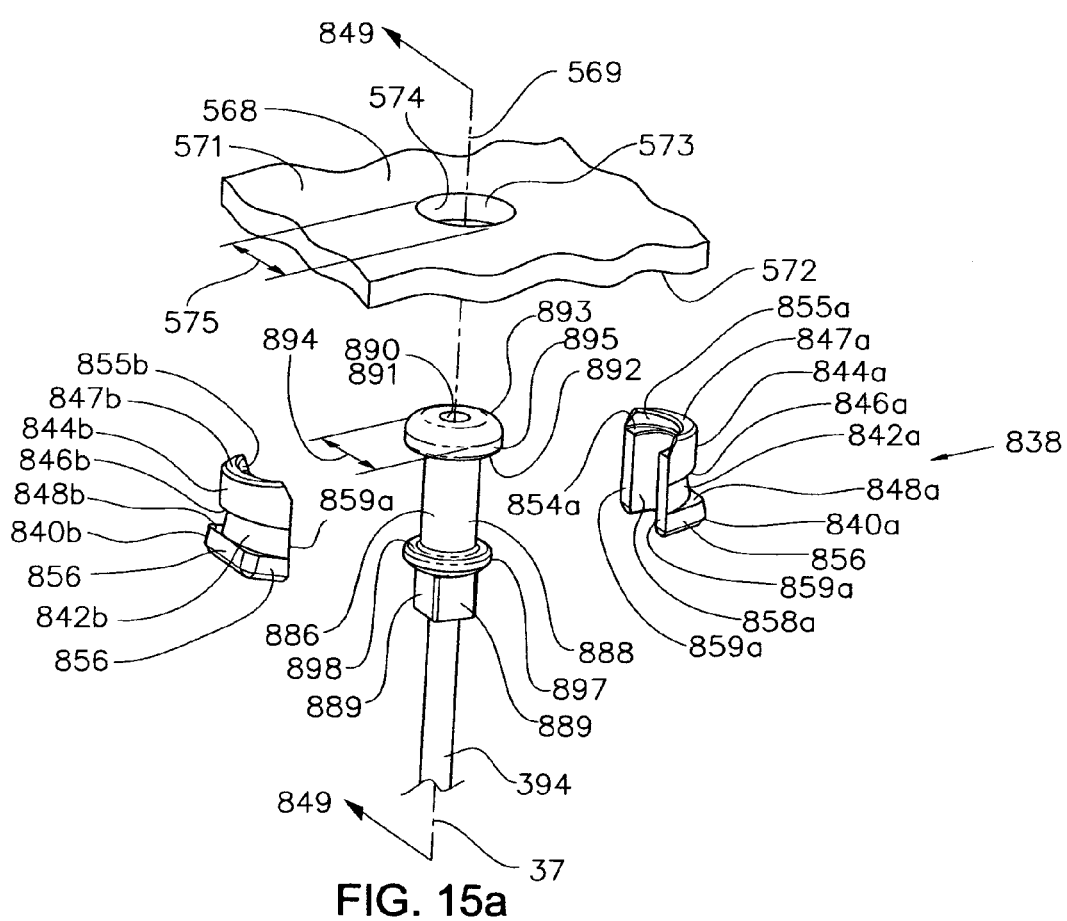
FIG. 15a is a partial exploded perspective view of an eleventh embodiment of the present invention, with spoke bed in fragmentary view, describing a blind connection between the spoke and the spoke bed, including an multi-piece expandable connector and a spoke nipple.

As shown in FIGS. 15a-b, segments 840a and 840b are aligned to be preassembled to the nipple 886, with gap faces 859a and 859b aligned to be generally parallel to each other and extending generally parallel to the longitudinal axis 37. As shown in FIG. 15c, segments 840a and 840b are moved in directions 861a and 861b respectively until the shank portion 888 is nested within necked openings 858a and 858b to create the preassembly 857 of segments 840a and 840b, and nipple 886. Although they are obscured in the section view of FIG. 15c, gap faces 859a are now meeting and abutting against gap faces 859b. Segments 840a and 840b are in a collapsed and laterally proximal orientation relative to each other. Step faces 854a and 854b are generally orthogonal to respective cylindrical counterbore portions 855a and 855b, which are at angle 862 relative to the longitudinal axis 37. End faces 847a and 847b are longitudinally abutting transition surface 892 and flange portions 848a and 848b are longitudinally adjacent flange face 898. It is noted that the cylindrical enlarged portions 844a and 844b are aligned to fit within a projected lateral envelope that generally corresponds with the diameter 894 of cylindrical surface 895 such that this entire preassembly 857 of connector 838 and nipple 886 may now be fitted through hole 73.

Figures 15E, 15F, 15G:
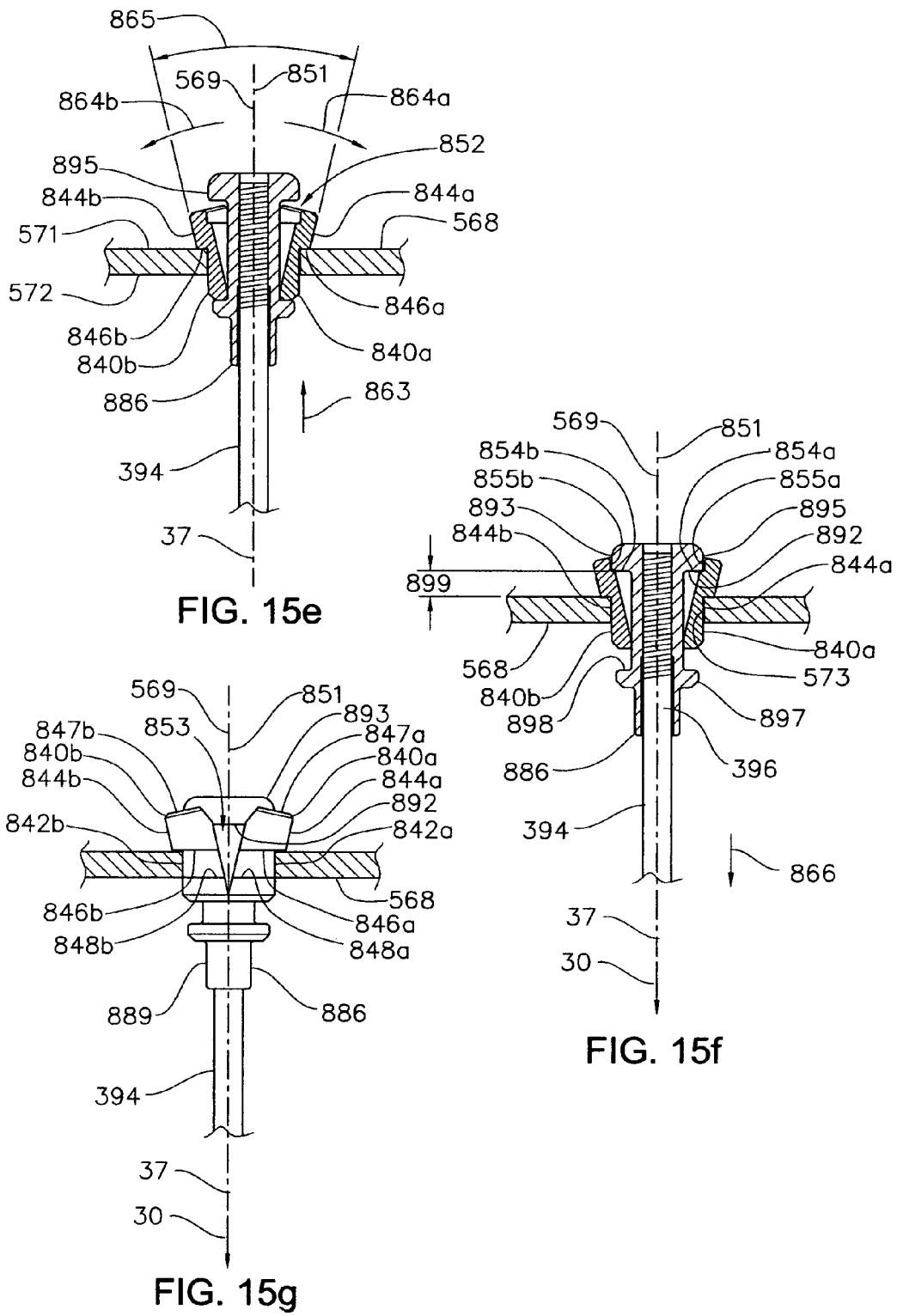
FIG. 15e is a cross section view, taken along 849-849, of the embodiment of FIG. 15a, showing the pre-assembly of FIG. 15d as fully inserted through the hole of the spoke bed, with the segments splayed and with overhang surfaces overlying the outboard surface.
FIG. 15f is a cross section view, taken along 849-849, of the embodiment of FIG. 15a, showing the spoke and nipple withdrawn such that the transition surface is overlying the step faces of the segments.
FIG. 15g is a fragmentary view, of the embodiment of FIG. 15a and corresponding to the view of FIG. 15f, with the spoke bed in cross section.

Next, FIG. 15d shows the initiation of a second assembly/installation step where the preassembly 857 is being installed within hole 573 in direction 863, with diameter 894 sized to fit through hole 573. Cylindrical surface 895 and enlarged portions 844a and 844b are shown to be overlapping hole sidewall 574 along the central axis 569. Next, the preassembly 857 is fully advanced in direction 863 until the flange portions 848a and 848b abut inboard surface 572 and overhang surfaces 846a and 846b are aligned to be just beyond outboard surface 571. Segments 840a and 840b may now be splayed in directions 864a and 864b by splay angle 865 to achieve an expanded and laterally distal orientation relative to each other as shown in FIG. 15e. In this expanded orientation, overhang surfaces 846a and 846b are now overlying, hooking and engaged to outboard surface 571. Step faces 854a and 854b are now generally orthogonal to the longitudinal axis 37 and semicylindrical counterbore portions 855a and 855b combine to achieve a generally cylindrical cavity that extends to be generally parallel to longitudinal axis 37. The opening 852 between segments 840a and 840b is correspondingly expanded to include counterbore portions 855a and 855b and necked openings 858a and 858b and gaps 853 extending along opening axis 851. Also, it may be seen that the flange portions 848a and 848b combine to create a generally square and noncircular profile that includes flats 856 such that it may be manually manipulated with a wrench (not shown).

Spoke 394 and nipple 386 are next drawn in direction 866, in a third installation step, until the transition surface 892 abuts step faces 854a and 854b as shown in FIG. 15f. Cylindrical surface 895 is now longitudinally overlapping and nested within counterbore portions 855a and 855b. With segments 840a and 840b opposed and fully seated as shown, the connector 838 is considered to be open, spread or laterally expanded, such that gaps 853 are created between the two. These gaps 853 are necessary to provide the requisite clearance to allow segment 840b to be collapsed against segment 840a and to permit enlarged portions 844a and 844b to clear the hole 573 during the previous second installation step.

It is noted that segments 840a and 840b are angularly expanded and splayed in non-parallel and arcuate directions 864a and 864b during their expansion as shown. Correspondingly, gaps 853 are generally tapered and wedge-shaped, as shown in FIG. 15g, with a narrower gap 853 portion adjacent the flange portions 848a and 848b and a wider gap 853 portion adjacent end faces 847a and 847b. In contrast, the segments 608a and 608b of FIGS. 6a-j remain generally parallel during their expansion as shown and are laterally expanded in a generally opposed linear direction 625a and 625b, with a generally straight gap 627 between the two.

The diameter 894 of head portion 893 is a close fit between counterbore portions 855a and 855b while the connector 838 is in its expanded, splayed, or open orientation, thus providing a bracing and blocking engagement between the segments 840*a* and 840*b* to limit their laterally proximal or inward movement and preventing the connector 838 from inadvertently achieving an unexpanded or collapsed orientation. The segments 840*a* and 840*b* are now locked in their expanded and spread orientation. Thus, the overlie engagement between the overhang surfaces 846*a* and 846*b* and outboard surface 571 is now maintained, thereby locking the connector 838 to the spoke bed 568.

Further, the laterally projecting transition surface 892 now has an overlie engagement with step faces 854*a* and 854*b* and the nipple 886 is thus engaged to the connector 838 to resist spoke tension 30 forces along tensile axis 36 and to retain the spoke 394 to the spoke bed 568. It should be noted that the nipple 886 serves as an intermediate connecting element between the spoke 394 and the connector 838 to effectively join the spoke 394 to the spoke bed 568 to resist spoke tension 30. Thus, a blind connection between the spoke 394 and the spoke bed 568 is achieved. Spoke tension may be adjusted in the conventional manner, with nipple 886 rotated (via flats 889) independently of the spoke 394 about the longitudinal axis 37 to threadably adjust the engagement between internal threads 891 and external threads 395. Further, the nipple 886 may be rotated independently of the connector 838 about the opening axis 851, and the connector 838 may be held stationary during this adjustment by means of a wrench (not shown) engaged with flats 856. The spoke overlie engagement between transition surface 892 and step faces 854*a* and 854*b* is oriented longitudinally outwardly (by offset distance 899) from the connector overlie engagement between overhang surfaces 846*a* and 846*b* and outboard surface 571. As described previously, this longitudinally outward extending offset distance 899 is preferable to the spoke overlie engagement and connector overlie engagement being oriented longitudinally coincident or to the spoke overlie engagement being oriented longitudinally inward of the connector overlie engagement.

While my above description contains many specificities, these should not be construed as limitations on the scope of the invention, but rather as exemplifications of embodiments thereof. It is to be understood that the invention is not limited to the illustrations described and shown herein, which are deemed to be merely illustrative of the best modes of carrying out the invention, and which are susceptible of modification of form, size, and arrangement of parts and details of operation. For example:

While the embodiments shown herein show a connector consisting of two discreet segments, the connector may alternatively consist of three or more discreet segments.

While it is shown in many of these figures that the central axis of the opening of the connector is generally collinear with the central axis of the corresponding hole in the spoke bed, the central axis of the opening may alternatively be offset (i.e. eccentric) or may be at a nonparallel angle with respect to the central axis of the corresponding hole. Further, while it is shown in many of these figures that the central axis of the opening of the connector is generally collinear with the tensile axis 36 of the spoke span, the central axis of this opening may alternatively be at an angle to the tensile axis 36. In such a case, the spoke may be bent or deflected such that its longitudinal axis is aligned with the opening.

The sleeve and/or nipple may be regarded as an intermediate component in the connection between the spoke and the connector. In other words, the spoke connects to the sleeve and/or nipple, the sleeve and/or nipple connects to the connector, and the connector connects to the rim or hub. Further, there may alternatively be additional intermediate components inserted in this chain of connection.

These figures show the connector component to include a flange located externally and longitudinally inward relative to the hole to which the connector is assembled. Such a flange may be useful in creating an external overlie engagement with the inboard surface of the spoke bed to control positioning of the connector and also prevent the connector from inadvertently being pushed clear through the hole. However, it should be recognized that the primary engagement of the present invention is the engagement to resist spoke tension, which is in the opposite direction to the overlie engagement of the flange. Therefore, the flange may provide a desirable convenience to aid in the assembly and/or retention of the ferrule but may not be a requirement for proper function of some or all of the embodiments described herein. The present invention may still be functional without incorporating an external flange of the connector.

The connector component may remain stationary with respect to spoke bed, while the sleeve and/or the spoke may be rotated about the longitudinal axis. Alternatively, the connector component may be permitted to rotate relative to the spoke bed. If desired, this would allow the connector to rotate and slip at its interface with the spoke bed.

The embodiments described herein show a hole in the spoke bed that is generally circular about the central axis as well as segments with generally circular cylindrical collar portions. This circular hole may be preferable, since such a hole may be easily achieved in a simple drilling operation. However, the hole in the spoke bed may alternatively be non-circular about the central axis. Further, the collar portion(s) of the connector may have projections or reliefs or other non-circular geometry. Still further, the noncircular geometry of the connector may mate with the noncircular hole of the spoke bed for a rotationally keyed engagement about the central axis and/or about the longitudinal axis.

Several of the embodiments described herein also show a spoke bed with generally flat inboard and outboard surfaces. Alternatively, the inboard and/or outboard surface of the spoke bed may be non-flat and employ a configured surface with projections and/or recesses. Further, the overhang surface(s) and/or flange of the connector may have non-flat geometry where these portions contact the spoke bed. Still further, the non-flat geometry of the overhang surface(s) and/or flange of the connector may mate with the non-flat geometry of the inboard and/or outboard surface of the spoke bed. Such mating of non-flat surfaces may provide a rotationally keyed engagement between the connector and the spoke bed about the central axis and/or about the longitudinal axis.

While the embodiments shown herein show the segments of the connector as relatively rigid elements that do not flex appreciably during assembly or operation. However, one or more of the segments may be designed to flex or distort during assembly or during operation. For example, one of the segments may be designed to flex slightly as it is inserted though the hole in the spoke bed during assembly and then spring back to its original form once it has been fully inserted. This flexure may serve to provide additional clearance for insertion of the segment.

The embodiments described herein show a blind connection with a blind hole through which the connector is connected. However the present invention may prove to be advantageous to achieve such a blind connection even in arrangements where the hole itself is not a blind hole and there is access to both ends of the hole.

While the embodiments described herein show a surface-to-surface overlie engagement between a surface of the spoke and a surface of the connector, it is also envisioned that this overlie engagement may include a surface-to-edge engagement, where the spoke or the connector includes an engagement edge that has an overlie engagement with a surface of the other of the spoke or connector.

The embodiments described herein show the spoke as connected to the connector via a connection between the spoke and both segments (i.e. the full complement of segments) of the connector. However it is envisioned that the spoke may alternatively be connected to only one of the segments (i.e. less than the full complement of segments).

The embodiments described herein show the each segment of the connector to include an overhang surface to engage the spoke bed. Alternatively, one (or more) of the segments may not include an enlarged portion and/or an overhang surface to engage the spoke bed. However, at least one of the segments must include the requisite overhang surface to engage the spoke bed. Further, many of the embodiments described herein show a connector with all of its overhang surfaces coinciding with a generally common plane. It is envisioned that the multiple overhang surfaces of a single connector may be offset from each other along the longitudinal axis and may correspond to different longitudinal heights.

Accordingly, the scope of the invention should be determined not by the embodiments illustrated, but is instead intended to encompass all such modifications that are within its spirit and scope as defined by the claims.

What is claimed is:

1. A vehicle wheel, comprising:
   a peripheral rim;
   a central hub with a central axle and an outer flange;
   a plurality of spokes extending between said rim and said hub with a first portion connected to said rim and a second portion opposed to said first portion and connected to said hub and a span portion between said rim and said hub, wherein said spoke is a generally slender element with a length greater than its width and a longitudinal axis along its length and a tensile axis of applied tensile load along said span portion;
   a bracing element including a hole therein with a central axis, a hole sidewall, a longitudinally inward opening, and at least one of an engagement surface and an engagement edge adjacent said hole and longitudinally outward of said opening;
   a multi-piece connecting element connected to said bracing element and comprising a multiplicity of discreet segments to include a first segment and a second segment, wherein said first segment is generally laterally opposed to said second segment relative to said central axis in a first lateral direction;
   wherein said bracing element comprises at least a portion of at least one of said rim and said hub;
   including a generally longitudinal seam between said first segment and said second segment;
   wherein at least one of said first segment and said second segment includes an enlarged portion and a laterally projecting overhang surface with a lateral overhang width;
   wherein said enlarged portion of said first segment is bounded by said seam and extends in said first lateral direction;
   wherein said first segment is positioned to extend within said hole, with said overhang surface overlying at least one of said engagement surface and said engagement edge in an overlie engagement;
   wherein said second segment is positioned in said hole to include an opening between said first segment and said second segment and extending along an opening axis;
   wherein said spoke is positioned within said opening and connected to said connecting element;
   wherein said overlie engagement supports said applied tensile load; and
   wherein said first segment and said second segment may be inserted within said hole in the longitudinally outwardly direction.

2. A wheel according to claim 1, wherein said hole is a blind hole, where said hole is obscured longitudinally outwardly from said at least one of said engagement surface and said engagement edge.

3. A wheel according to claim 2, wherein said bracing element is said rim, including a spoke bed wall and a tire bed wall, wherein said spoke hole extends within said spoke bed wall and said tire bed wall serves to obscure said hole longitudinally outwardly from said at least one of said engagement surface and said engagement edge.

4. A wheel according to claim 1, wherein said first segment includes a collar portion adjacent said overhang surface and wherein said collar portion extends to overlap said hole sidewall along said central axis.

5. A wheel according to claim 4, including surface-to-surface contact between said collar portion and said hole sidewall, wherein said collar portion contacts said hole sidewall wherein said contact between said collar portion and said hole sidewall serves to control the displacement of said first segment relative to said hole in a direction generally lateral to said central axis.

6. A wheel according to claim 1, wherein at least one of said spoke and an intermediate connecting element connected to said spoke, serves to provide a blocking engagement between said first segment and said second segment to limit proximal movement therebetween in a direction lateral to said opening axis and to maintain said overlie engagement.

7. A wheel according to claim 6, wherein at least one of said first segment and said second segment includes a relief at said opening and wherein said spoke, or an intermediate connecting element connected to said spoke, is positioned within said relief to provide said blocking engagement.

8. A wheel according to claim 7, wherein said first segment includes a first said relief and said second segment includes a second said relief and wherein, said first relief and second relief are aligned to create said opening along said opening axis.

9. A wheel according to claim 8, wherein said opening is a generally circular cylindrical opening.

10. A wheel according to claim 8, wherein said opening includes internal threads to threadably mate with external threads of at least one of said spoke and an intermediate connecting element connected to said spoke.

11. A wheel according to claim 1, wherein said second segment serves to provide a blocking engagement between said first segment and said hole to limit proximal movement of said first segment in a direction lateral to said opening axis and to maintain said overlie engagement.

12. A wheel according to claim 1, wherein said opening includes a gap between said first segment and said second segment and wherein at least one of said spoke and an intermediate connecting element connected to said spoke extends within said gap to provide a blocking engagement between said first segment and said second segment to limit proximal movement of said first segment in a direction lateral to said opening axis and to maintain said overlie engagement.

13. A wheel according to claim 1, wherein at least one of said spoke and an intermediate connecting element connected to said spoke includes a laterally projecting surface to overlie said connecting element in an overlie spoke engagement between said spoke and said connecting element and wherein said overlie spoke engagement supports said applied tensile load.

14. A wheel according to claim 13, wherein said overlie spoke engagement is at least one of: (i) located longitudinally outwardly relative to said overlie engagement, and (ii) located longitudinally coincident relative to said overlie engagement.

15. A wheel according to claim 13, wherein said overlie spoke engagement is at least one of: (i) longitudinally overlapping said hole sidewall; (ii) longitudinally coincident with the longitudinally outboard entrance of said hole; and (iii) longitudinally outboard of said hole.

16. A wheel according to claim 13, wherein said overlie spoke engagement includes a threaded engagement.

17. A wheel according to claim 16, wherein said threaded engagement includes an externally threaded portion of said at least one of said spoke and said intermediate connecting element that is threadably engaged to an internally threaded portion of said connecting element.

18. A wheel according to claim 16, wherein said threaded engagement includes a self-tapping threaded engagement.

19. A wheel according to claim 1, wherein at least one of said spoke and an intermediate connecting element connected to said spoke serves to provide a blocking engagement between said first segment and said second segment to limit proximal movement therebetween in a direction lateral to said opening axis and to maintain a said overlie engagement, and wherein said blocking engagement is at least one of: (i) longitudinally overlapping said hole sidewall; (ii) longitudinally coincident with the longitudinally outboard entrance of said hole; and (iii) longitudinally outward of said hole.

20. A wheel according to claim 1, wherein at least one of said spoke and an intermediate connecting element connected to said spoke serves to provide a blocking engagement between said first segment and said second segment to limit proximal movement therebetween in a direction lateral to said opening axis and to maintain a said overlie engagement, and wherein said at least one of said spoke and said intermediate connecting element includes a laterally projecting surface to overlie said connecting element in an overlie spoke engagement between said spoke and said connecting element and wherein said overlie spoke engagement supports said applied tensile load, and wherein said overlie spoke engagement is located longitudinally inwardly relative to said blocking engagement.

21. A wheel according to claim 1, wherein said spoke, or an intermediate connecting element connected to said spoke, is connected to said connecting element by means of an integral joinder to provide a firm connection between said spoke and said connecting element and to support spoke tension forces.

22. A wheel according to claim 21, wherein said integral joinder is an adhesively bonded joinder.

23. A wheel according to claim 1, wherein said spoke is directly connected to said connecting element.

24. A wheel according to claim 1, including an intermediate connecting element, wherein said spoke is connected to said intermediate connecting element and said intermediate connecting element is connected to said connecting element.

25. A wheel according to claim 24, wherein said intermediate connecting element includes a non-circular portion to facilitate manual manipulation of said intermediate connecting element relative to said bracing element.

26. A wheel according to claim 24, wherein said spoke is rotatable relative to said intermediate connecting element about said longitudinal axis.

27. A wheel according to claim 1, wherein at least one of said spoke and an intermediate connecting element connected to said spoke is rotatable relative to said connecting element generally about said longitudinal axis.

28. A wheel according to claim 1, wherein at least one of said spoke and an intermediate connecting element connected to said spoke has a rotationally keyed engagement with said connecting element to limit relative rotation therebetween about said opening axis relative to said connecting element.

29. A wheel according to claim 1, wherein said connecting element may be independently rotated relative to said bracing element about said central axis.

30. A wheel according to claim 1, wherein said connecting element has a rotationally keyed engagement with said bracing element to limit relative rotation therebetween about said central axis.

31. A wheel according to claim 1, wherein said bracing element is said rim, including a spoke bed wall, wherein said hole is in said spoke bed wall.

32. A wheel according to claim 1, wherein said bracing element is said central hub and wherein said hole is in said outer flange.

33. A wheel according to claim 1, wherein said hole of said bracing element is a circular hole.

34. A wheel according to claim 1, wherein said hole of said bracing element is a non-circular hole.

35. A wheel according to claim 1, wherein at least one of said first segment and said second segment includes a flange portion longitudinally inward of said hole.

36. A wheel according to claim 35, wherein said flange portion includes a laterally projecting surface that extends laterally outwardly of said opening of said hole.

37. A wheel according to claim 35, wherein said flange portion includes a non-circular portion to facilitate manual manipulation of said connecting element about said central axis.

38. A wheel according to claim 35, wherein said flange portion provides a depth stop to limit the longitudinally outward advancement of said connecting element within said hole.

39. A wheel according to claim 1, wherein said multiplicity of said segments constitutes two segments.

40. A wheel according to claim 1, wherein said multiplicity of said segments constitutes three or more segments.

41. A wheel according to claim 1, wherein said central axis and said opening axis are generally collinear.

42. A wheel according to claim 1, wherein said central axis and said opening axis are generally laterally offset.

43. A wheel according to claim 1, wherein said central axis and said opening axis are generally non-parallel, with an angle therebetween.

44. A wheel according to claim 1, wherein said lateral overhang width of said first segment is sized such that, when said enlarged portion of said first segment is positioned within said hole to overlap said hole sidewall along said central axis, said enlarged portion of said second segment is restricted from simultaneously occupying said hole in a position longitudinally coincident with said enlarged portion of said first segment along said central axis.

45. A wheel according to claim 44, wherein said first segment is installed within said hole prior to the installation of said second segment within said hole in a sequential installation of said connecting element.

46. A wheel according to claim 1, wherein said enlarged portion of said first segment and said enlarged portion of said second segment may be simultaneously positioned within said hole to longitudinally overlap said hole sidewall along said central axis.

47. A wheel according to claim 46, wherein said first segment may be installed within said hole simultaneous to the installation of said second segment within said hole in a simultaneous installation of said connecting element.

48. A wheel according to claim 1, including a spacer element, wherein said opening includes a gap between said first segment and said second segment and wherein said spacer element extends within said gap to provide a blocking engagement between said first segment and said second segment to limit proximal movement therebetween in a direction lateral to said opening axis and to maintain said overlie engagement.

49. A wheel according to claim 1, wherein a first portion of said opening is bounded by said first segment and a second portion of said opening is bounded by said second segment, and wherein said first portion of said opening is laterally opposed to said second portion of said opening about said opening axis.

50. A wheel according to claim 1, wherein said first segment is blindly assembled to said bracing element in a longitudinally outward direction and through said longitudinally inward opening.

51. A wheel according to claim 1, wherein said overhang surface associated with said first segment is discreet from any overhang surface associated with said second segment.

52. A wheel according to claim 1, wherein said enlarged portion is integrally formed with the associated one of said first segment and said second segment.

53. A vehicle wheel, comprising:
- a peripheral rim;
- a central hub with a central axle and an outer flange;
- a plurality of spokes extending between said rim and said hub with a first portion connected to said rim and a second portion opposed to said first portion and connected to said hub and a span portion between said rim and said hub, wherein said spoke is a generally slender element with a length greater than its width and a longitudinal axis along its length and a tensile axis of applied tensile load along said span portion;
- a bracing element including a hole therein with a central axis, a hole sidewall, a longitudinally inward opening, and at least one of an engagement surface and an engagement edge adjacent said hole and longitudinally outward of said opening;
- a multi-piece connecting element connected to said bracing element and comprising a multiplicity of discreet segments to include a first segment and a second segment, wherein said first segment is generally laterally opposed to said second segment relative to said central axis in a first lateral direction;
- wherein said bracing element comprises at least a portion of at least one of said rim and said hub;
- including a generally longitudinal seam between said first segment and said second segment;
- wherein at least one of said first segment and said second segment includes an enlarged portion and a laterally projecting overhang surface with a lateral overhang width;
- wherein said enlarged portion of said first segment is bounded by said seam and extends in said first lateral direction;
- wherein said first segment is positioned to extend within said hole, with said overhang surface overlying at least one of said engagement surface and said engagement edge in an overlie engagement;
- wherein said second segment is positioned in said hole to include an opening between said first segment and said second segment and extending along an opening axis;
- wherein said spoke is positioned within said opening and connected to said connecting element;
- wherein said overlie engagement supports said applied tensile load; and
- wherein said lateral overhang width of said first segment is greater than the said lateral overhang width of said second segment.

* * * * *